(12) United States Patent
Sawada

(10) Patent No.: US 9,661,556 B2
(45) Date of Patent: May 23, 2017

(54) COMMUNICATION APPARATUS, METHOD FOR CONTROLLING COMMUNICATION APPARATUS, AND STORAGE MEDIUM

(75) Inventor: Tetsuya Sawada, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 759 days.

(21) Appl. No.: 12/775,193

(22) Filed: May 6, 2010

(65) Prior Publication Data

US 2010/0284318 A1 Nov. 11, 2010

(30) Foreign Application Priority Data

May 11, 2009 (JP) ................. 2009-114444

(51) Int. Cl.
*G08C 17/00* (2006.01)
*H04W 48/12* (2009.01)

(52) U.S. Cl.
CPC ............. *H04W 48/12* (2013.01); *Y02B 60/50* (2013.01)

(58) Field of Classification Search
USPC ............ 370/229, 230, 230.1, 235, 236, 310, 370/310.2, 311, 328, 395.2
See application file for complete search history.

(56) References Cited

U.S. PATENT DOCUMENTS

| 6,018,642 | A  | * | 1/2000  | Adachi ................. 340/7.33 |
| 6,469,991 | B1 | * | 10/2002 | Chuah .................. 370/329 |
| 7,583,651 | B2 | * | 9/2009  | Yamada et al. ........... 370/345 |
| 7,848,271 | B2 | * | 12/2010 | Salomone et al. ......... 370/311 |
| 2004/0072559 | A1 | * | 4/2004  | Kakumaru et al. ........ 455/422.1 |
| 2004/0137908 | A1 | * | 7/2004  | Sinivaara et al. ......... 455/452.1 |
| 2005/0030918 | A1 | * | 2/2005  | Motegi et al. ............. 370/328 |
| 2005/0054357 | A1 | * | 3/2005  | Takiishi et al. ............ 455/502 |
| 2005/0085279 | A1 | * | 4/2005  | Aoki ...................... 455/574 |
| 2006/0148534 | A1 | * | 7/2006  | Shih ...................... 455/574 |
| 2006/0221919 | A1 | * | 10/2006 | McRae et al. ............ 370/338 |
| 2007/0086471 | A1 | * | 4/2007  | Igarashi et al. ........... 370/412 |
| 2008/0254841 | A1 | * | 10/2008 | Miyata ................... 455/574 |
| 2009/0203377 | A1 | * | 8/2009  | Kawasaki ............... 455/435.1 |
| 2010/0054179 | A1 | * | 3/2010  | Meyer ................... 370/328 |
| 2010/0135195 | A1 | * | 6/2010  | Sakoda ................... 370/311 |
| 2012/0176949 | A1 | * | 7/2012  | Meylan et al. ............ 370/311 |

FOREIGN PATENT DOCUMENTS

| JP | 2002-319886 | A  | 10/2002 |
| JP | 2005-130436 | A  | 5/2005  |
| JP | 2006-163793 | A  | 6/2006  |
| JP | 2007-104033 | A  | 4/2007  |
| JP | 2008-235961 | A  | 10/2008 |
| WO | 2005/034434 | A1 | 4/2005  |

OTHER PUBLICATIONS

Office Action issued on Feb. 19, 2013 in counterpart Japanese Application No. 2009-114444.

* cited by examiner

*Primary Examiner* — Kwang B Yao
*Assistant Examiner* — Nguyen Ngo
(74) *Attorney, Agent, or Firm* — Carter, DeLuca, Farrell & Schmidt, LLP

(57) ABSTRACT

A communication apparatus includes a recognition unit configured to recognize a transmission interval of a predetermined beacon transmitted by a base station configured to transmit data addressed to a plurality of apparatuses when the predetermined beacon is transmitted, and a control unit configured to perform control to change the transmission interval based on the recognized transmission interval.

5 Claims, 19 Drawing Sheets

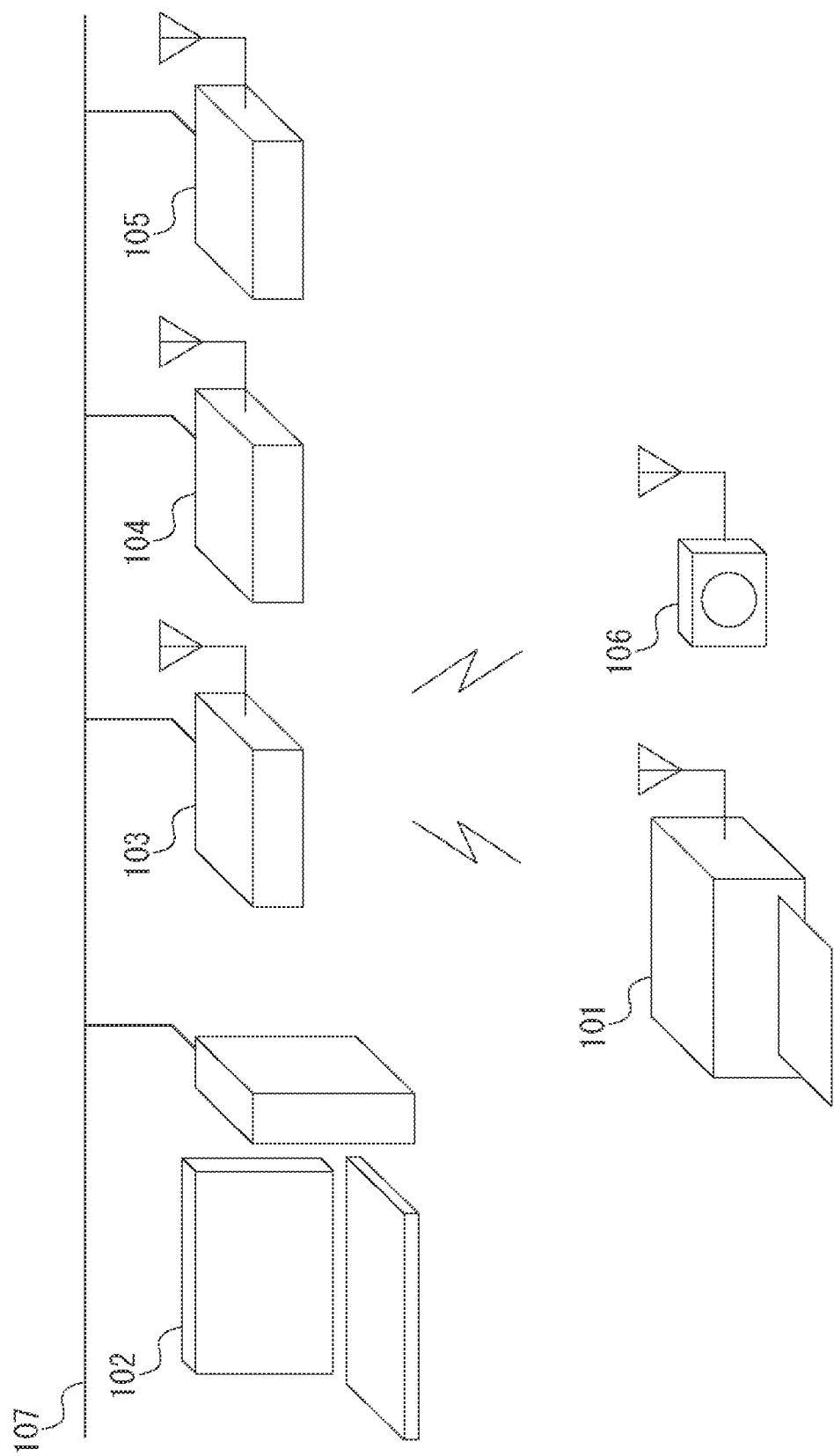

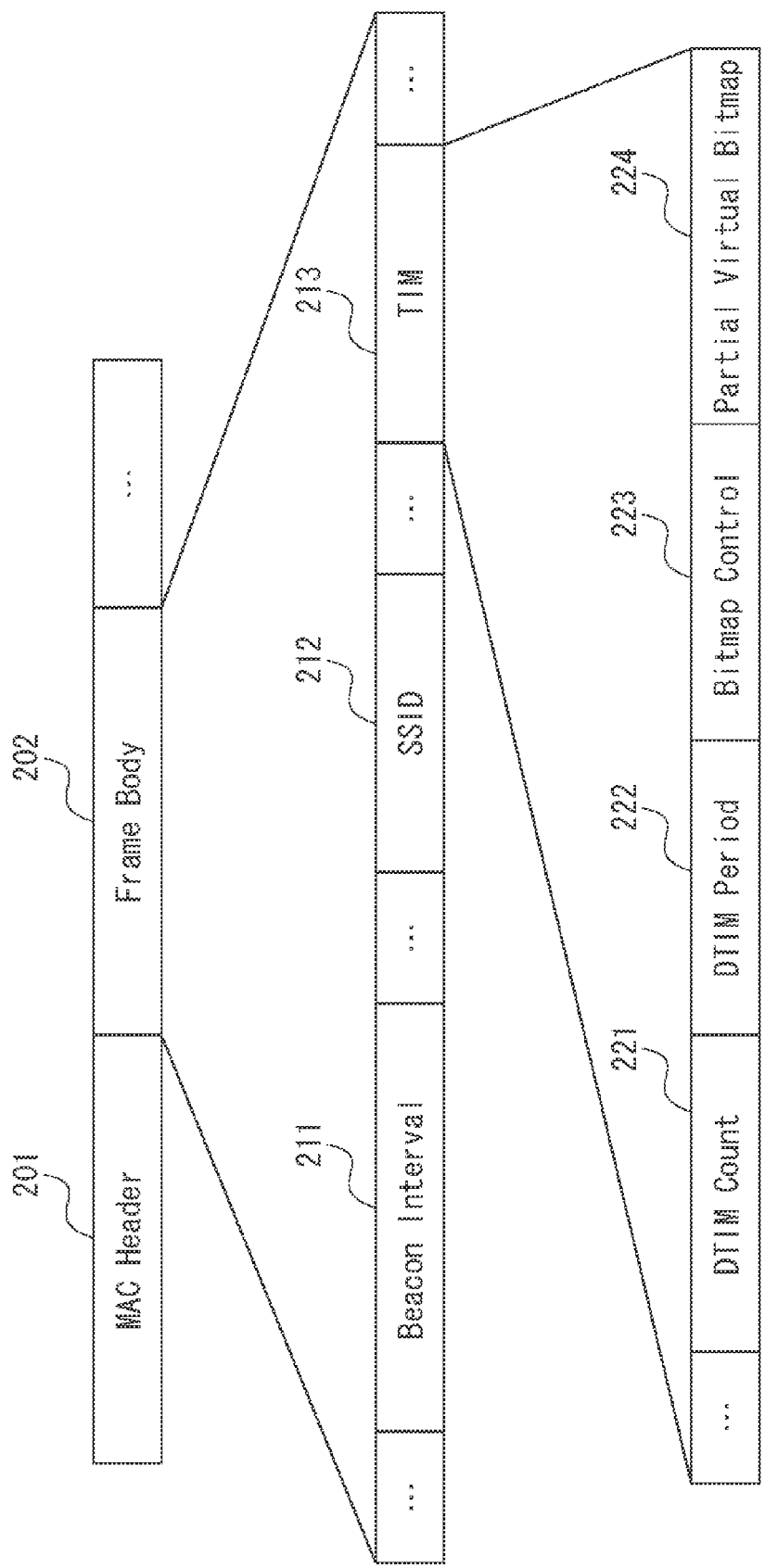

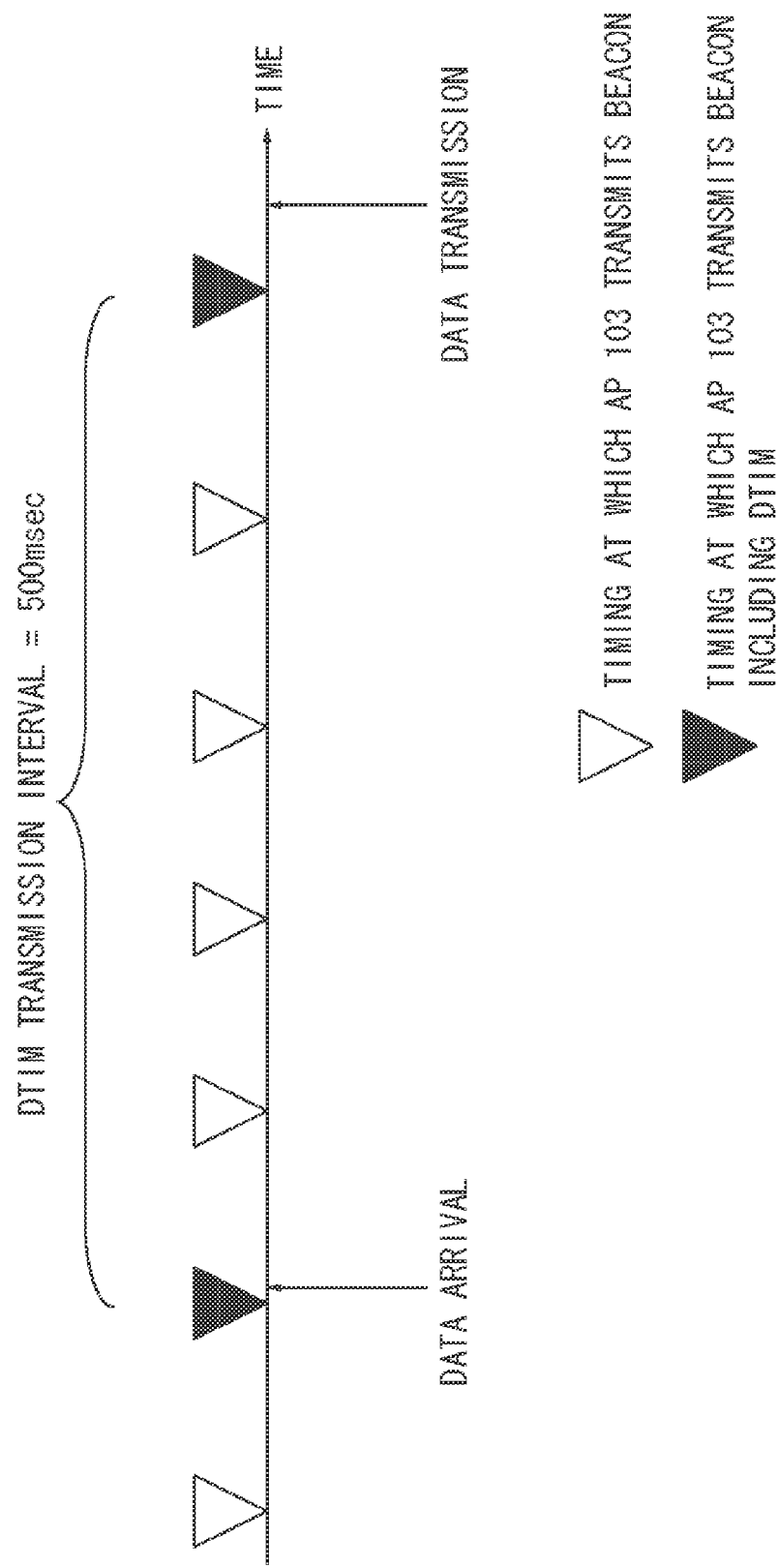

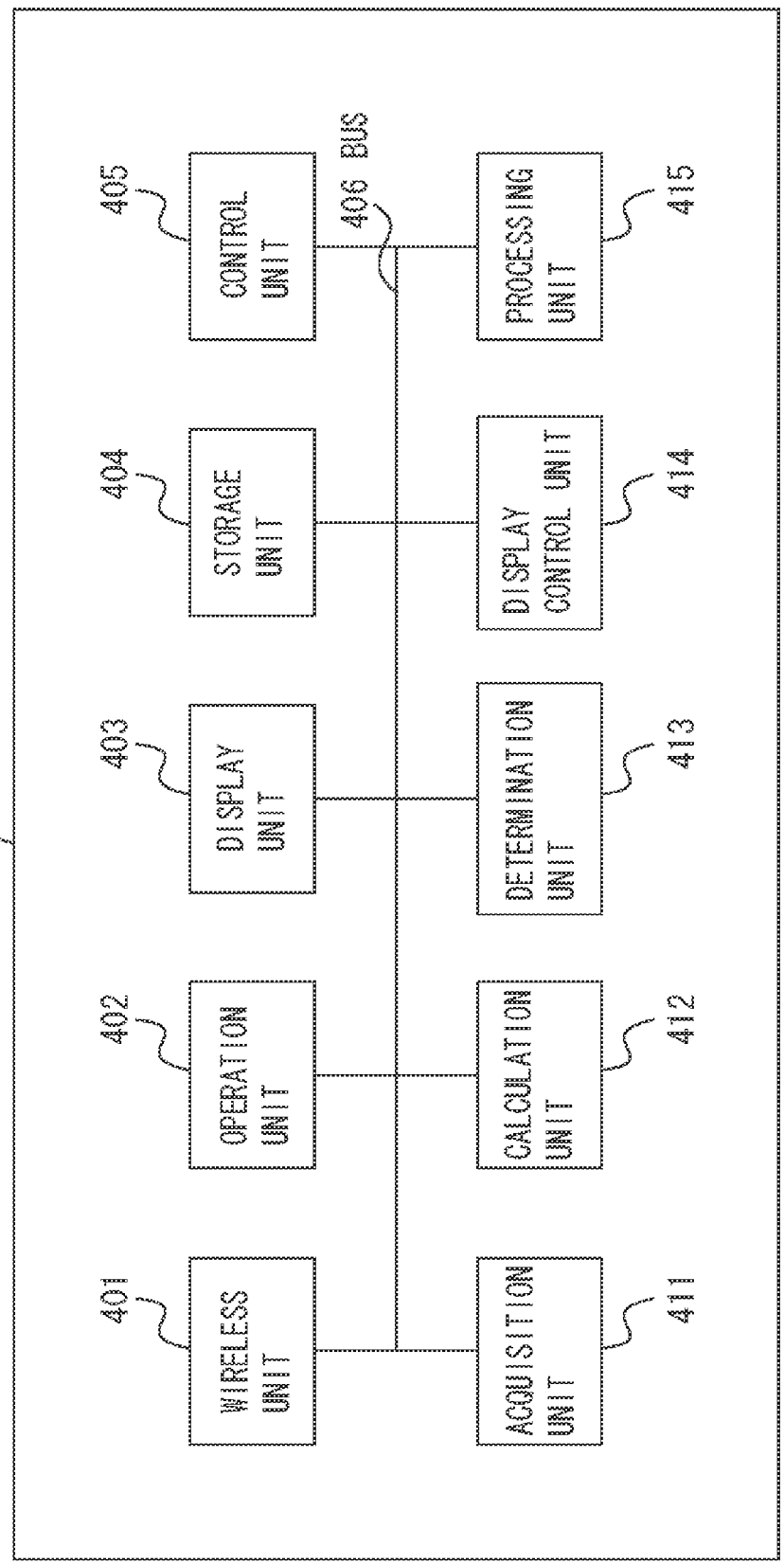

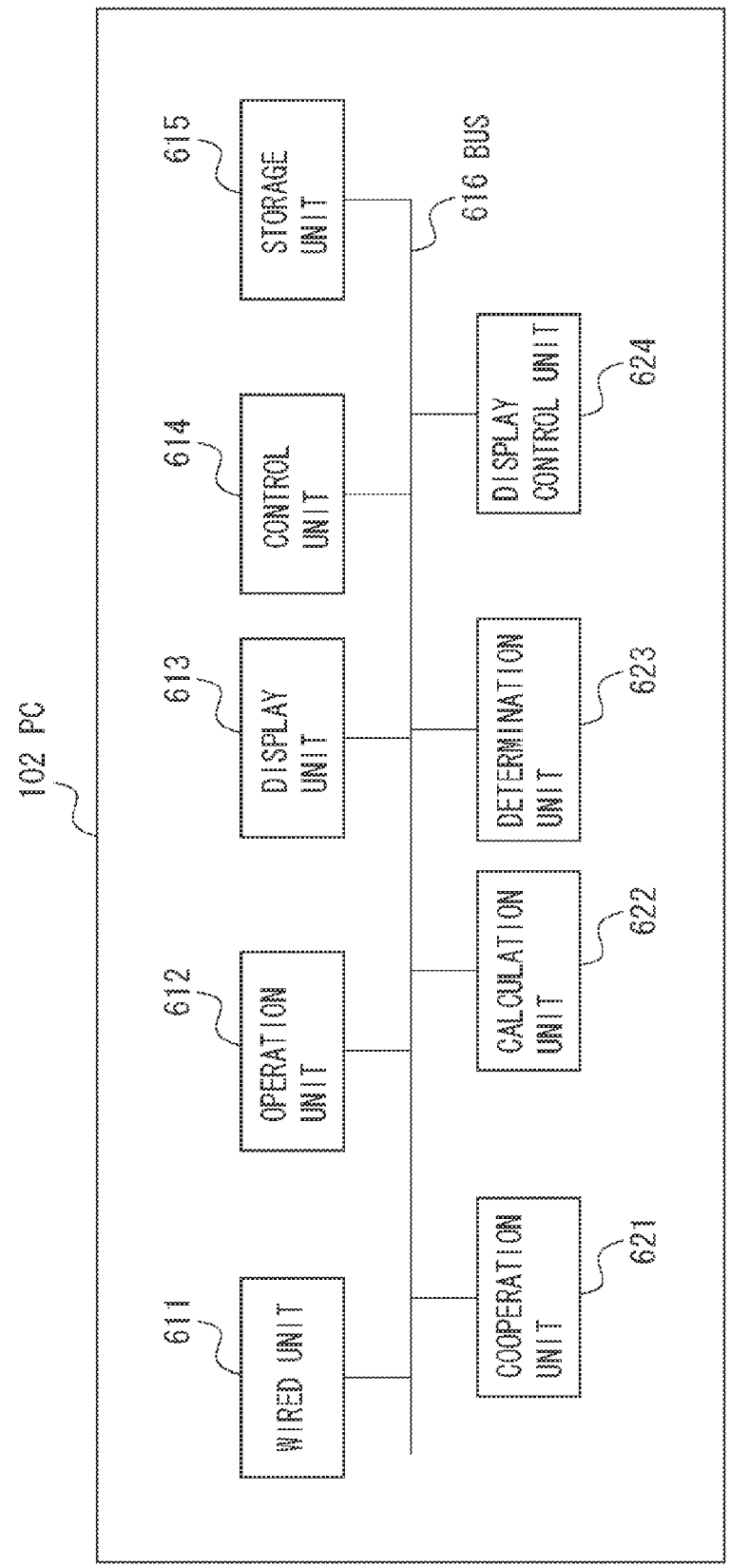

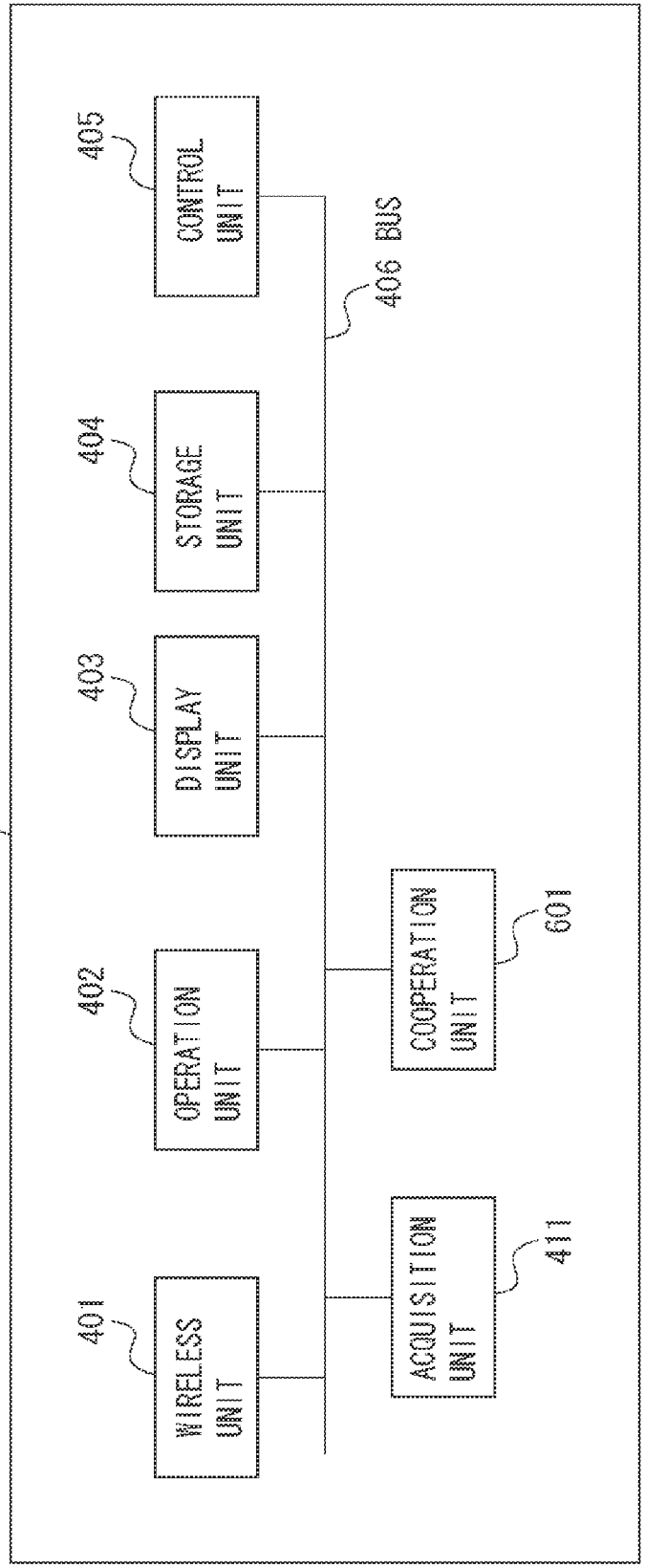

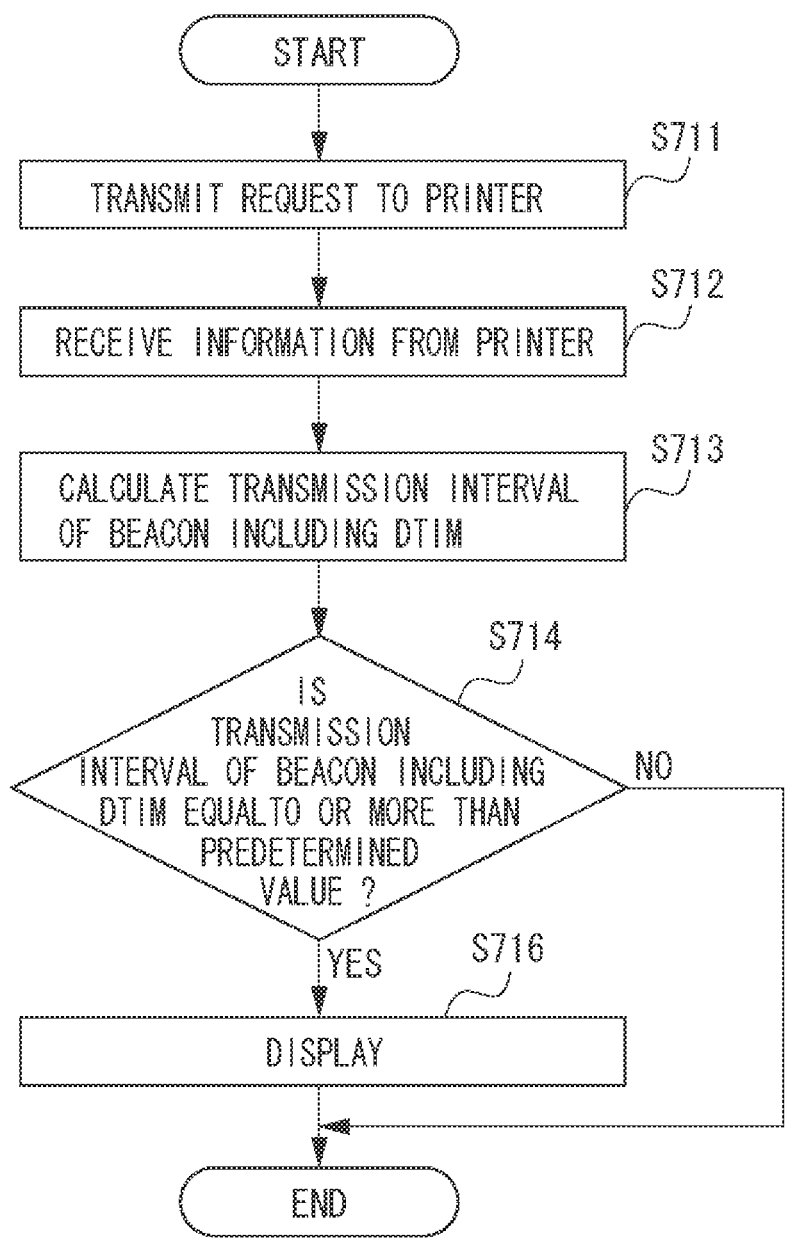

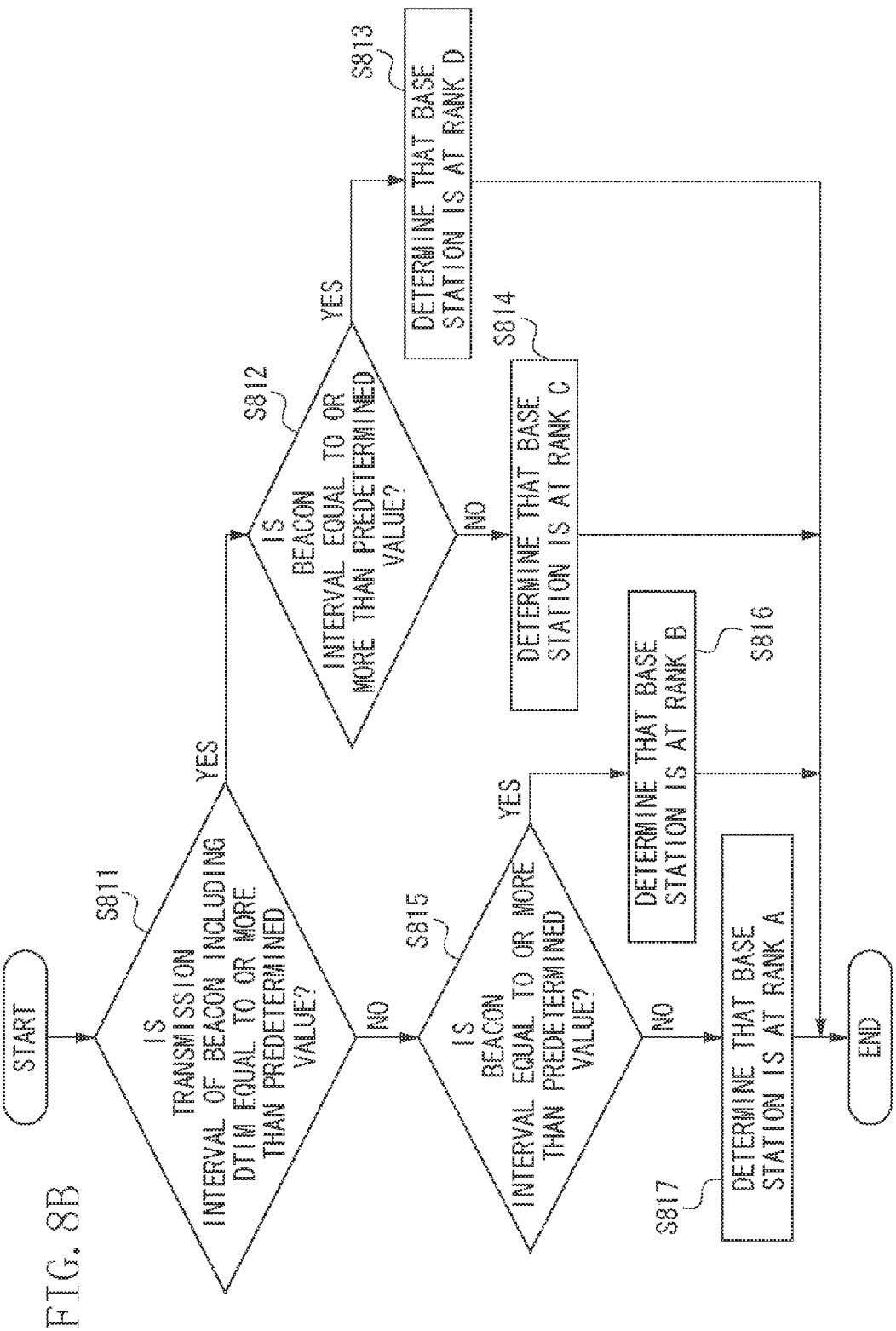

FIG. 9

| SSID | MESSAGE |
|---|---|
| "AP104" | GOOD: THIS IS RECOMMENDED. (PLEASE SEE SETTING MANUAL IF YOU WANT TO REDUCE POWER CONSUMPTION.) |
| "AP103" | NOT GOOD: DATA RECEPTION MAY FAIL. (PLEASE SEE SETTING MANUAL IF YOU WANT TO INCREASE RELIABILITY OF DATA RECEPTION.) |
| "AP105" | BAD: THERE IS PROBLEM IN DATA RECEPTION. (PLEASE SEE SETTING MANUAL IF YOU WANT TO INCREASE RELIABILITY OF DATA RECEPTION.) |

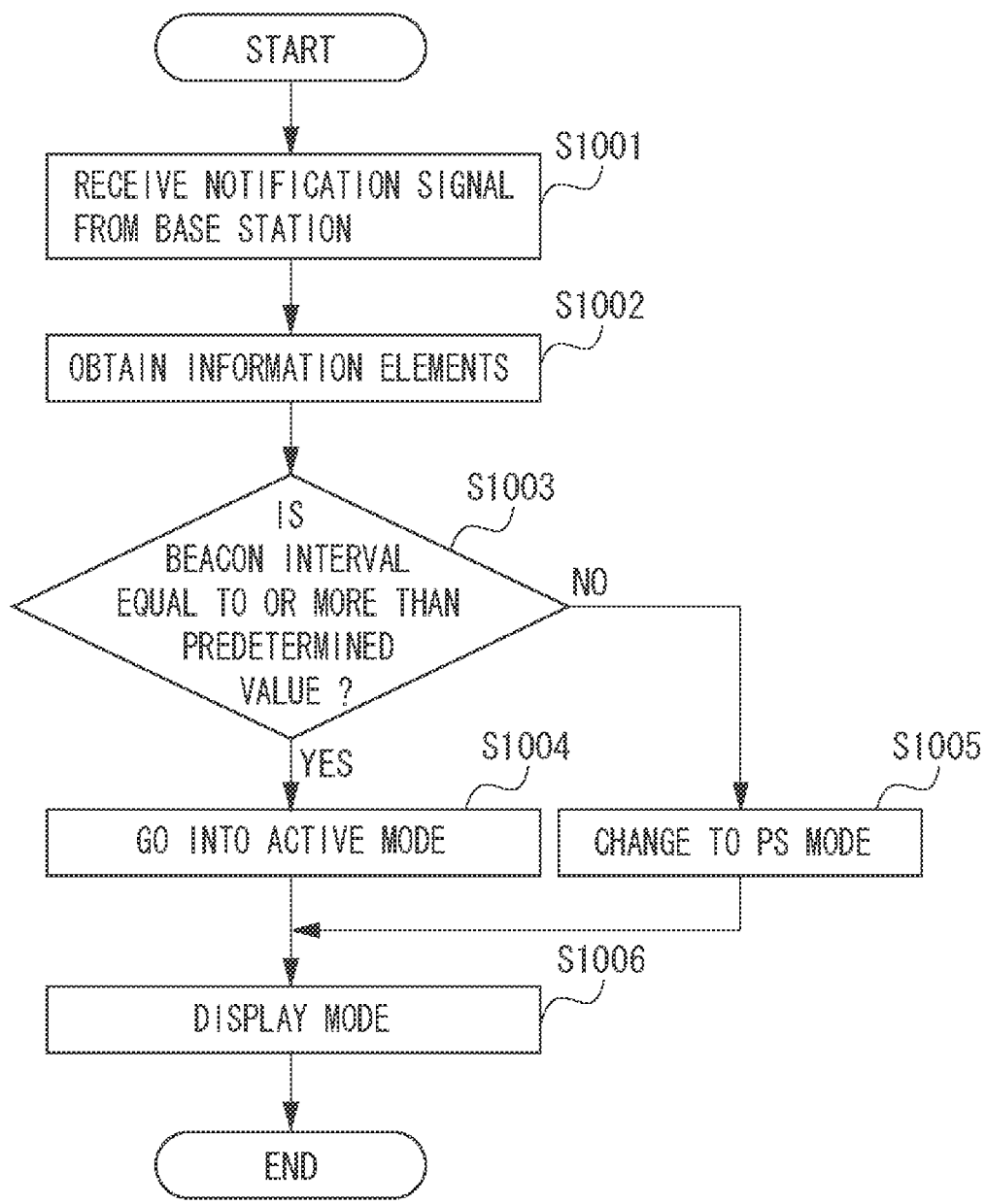

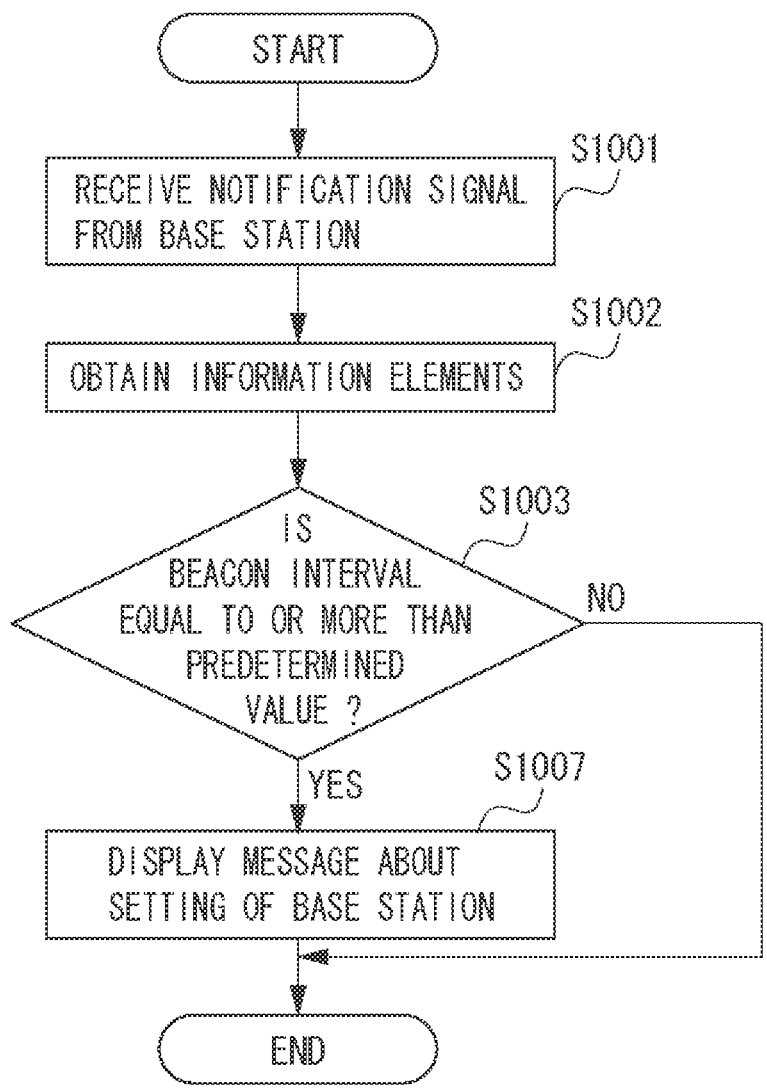

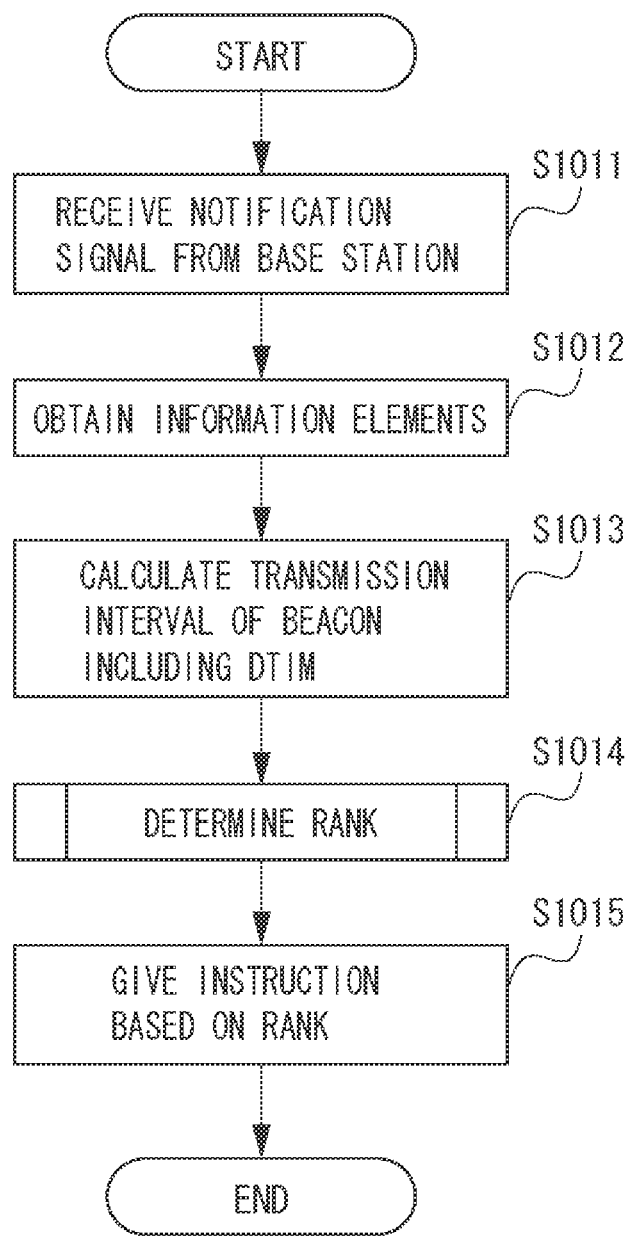

COMMUNICATION APPARATUS, METHOD FOR CONTROLLING COMMUNICATION APPARATUS, AND STORAGE MEDIUM

BACKGROUND OF THE INVENTION

Field of the Invention

The present invention relates to a communication apparatus, a method for controlling the communication apparatus, and a storage medium.

Description of the Related Art

There has been a power saving (PS) mode defined in Institute of Electrical and Electronics Engineers (IEEE) 802.11 series. When a communication apparatus in the PS mode resides in a network established by a base station, the base station does not immediately transmit data even if the base station receives broadcast or multicast data. The base station transmits a beacon including a special information element called a Delivery Traffic Indication Message (DTIM) according to a transmission interval defined in the base station, and then transmits broadcast or multicast data. The base station notifies the communication apparatus in the PS mode of the presence of data using an information element called a Traffic Indication Map (TIM) included in the beacon, and then transmits unicast data. U.S. Patent Application Publication No. 2004/0072559 A1 discusses an example of a communication apparatus operable in the PS mode, wherein the interval of beacon reception is changeable according to the operation mode of a communication application running on the communication apparatus.

However, since the base station transmits a beacon according to the transmission interval defined in the base station, there may be a case where transmission of data delays according to the setting of the base station. When audio or video data requiring real-time transmission is distributed, delay in data transmission results in deterioration of the quality of audio or video. On the other hand, when a communication apparatus with which the base station communicates transmits data requesting a response, if the base station delays transmission of the data, the communication apparatus that has transmitted the data requesting a response becomes unable to receive the response within a certain period of time, and results in time-out of communication.

SUMMARY OF THE INVENTION

According to an aspect of the present invention, a communication apparatus includes a recognition unit configured to recognize a transmission interval of a predetermined beacon transmitted by a base station configured to transmit data addressed to a plurality of apparatuses when the predetermined beacon is transmitted, and a control unit configured to perform control to change the transmission interval based on the recognized transmission interval.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 illustrates a configuration of a communication system according to an exemplary embodiment of the present invention.

FIG. 2 illustrates a configuration of a control signal transmitted by a base station.

FIG. 3 illustrates a relationship between transmission of data and transmission of a beacon including DTIM.

FIG. 4 is a configuration diagram illustrating a communication apparatus.

FIGS. 6A and 6B are configuration diagrams of the communication apparatus.

FIGS. 7A to 7C are flowcharts executed by the communication apparatus.

FIGS. 8A and 8B are flowcharts executed by the communication apparatus.

FIG. 9 illustrates a message displayed on a display unit.

FIGS. 10A to 10C are flowcharts executed by the communication apparatus.

DESCRIPTION OF THE EMBODIMENTS

Figure 5A:
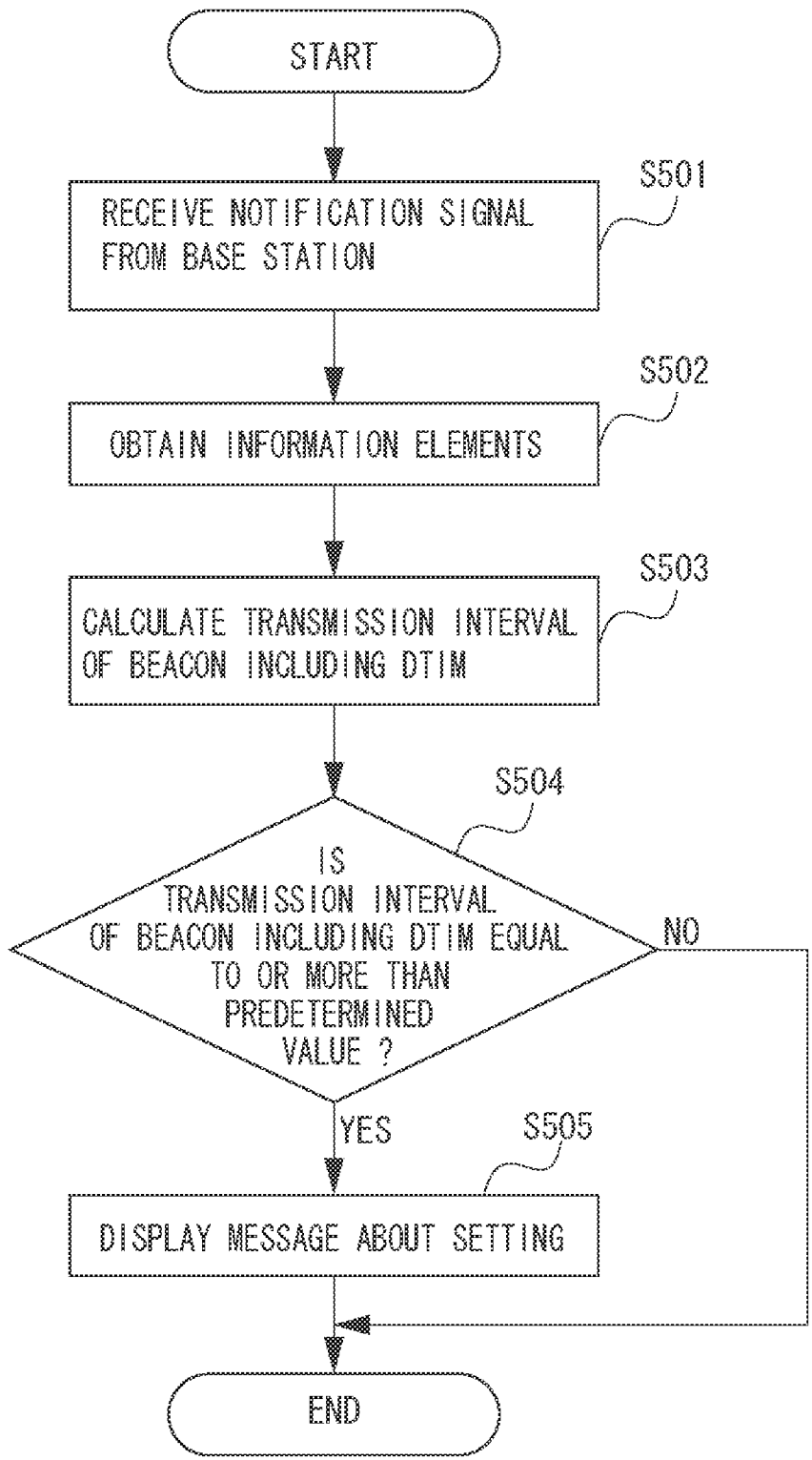
FIGS. 5A to 5D are flowcharts executed by the communication apparatus.

Various exemplary embodiments, features, and aspects of the invention will be described in detail below with reference to the drawings.

FIG. 1 illustrates a configuration of a communication system according to a first exemplary embodiment of the present invention. The communication system includes a printer 101 and a digital camera 106 serving as communication apparatuses in conformity with IEEE 802.11 series, a personal computer (PC) 102 serving as a communication apparatus in conformity with IEEE 802.3, access points (AP) 103 to 105 serving as a base station in conformity with IEEE 802.11 series, and a cable 107 in conformity with IEEE 802.3. In the present exemplary embodiment, the printer 101 can wirelessly communicate with the AP 103. Further, the digital camera 106 is present in a network established by the AP 103. The digital camera 106 is in a power saving (PS) mode defined by IEEE 802.11 series. The communication apparatus in the PS mode intermittently receives a beacon from the base station, and accordingly can reduce the power consumption.

FIG. 2 illustrates a configuration of a media access control (MAC) layer of a notification signal (beacon) transmitted by the base stations (AP 103 to 105). The beacon includes a MAC header 201 and a frame body 202. The frame body 202 includes a beacon transmission interval 211, a service set identifier (SSID) 212, and a traffic indication map (TIM) 213. The beacon interval 211 represents a time interval with which the base station transmits a beacon. The user can set the beacon interval 211 to any value. In this example, the beacon interval 211 of the AP 103 is set to "100". The AP 103 transmits the beacon every 100 msec. The SSID 212 is an identifier for identifying a base station.

The TIM 213 includes a Delivery Traffic Indication Message (DTIM) count 221, a DTIM period 222, a bitmap control 223, and a partial virtual bitmap 224. A beacon in which the value of the DTIM count 221 is "0" is called a "beacon including DTIM" in the present specification. The DTIM period 222 represents a frequency in which the base station transmits the beacon including DTIM. The user sets the DTIM period 222 to any value. In this example, the DTIM period 222 of the AP 103 is set to "5". While the AP 103 transmits the beacon five times, the AP 103 transmits the beacon including DTIM once. Since the AP 103 transmits the beacon every 100 m sec, the AP 103 transmits the beacon including DTIM every 500 msec (100 msec×5). In the network established by the AP 103, there is a communication apparatus (the digital camera 106) in the PS mode. Therefore, even when the AP 103 receives broadcast or multicast data, the AP 103 does not immediately transmit the data. After the AP 103 transmits the beacon including DTIM, the AP 103 transmits a notification signal such as broadcast or multicast. In other words, the beacon including DTIM is an example of a predetermined beacon transmitted before the base station transmits data addressed to a plurality of apparatuses.

Therefore, as illustrated in FIG. 3, it is assumed that the AP 103 receives broadcast or multicast data right after the AP 103 transmits the beacon including DTIM. In this case, data is transmitted with a delay of approximately a transmission interval time (in this case, 500 msec) of the beacon including DTIM. Further, depending on timing of arrival of the data, the delay may be greater than the transmission interval time of the beacon including DTIM. As described above, the delay time increases according to the transmission interval of the beacon including DTIM. In this example, examples of data transmitted via broadcast or multicast include an Address Resolution Protocol (ARP) request, a Reverse Address Resolution Protocol (RARP) request, and an Advertisement defined by UPnP. When there is a delay in transmission of these data, for example, a time-out may occur. The bitmap control 223 and the partial virtual bitmap 224 indicate which of the communication apparatuses the data stored in the base station is addressed to.

FIG. 4 is a hardware configuration diagram illustrating the printer 101 serving as a communication apparatus. A wireless unit 401 includes a wireless chip and an antenna in conformity with IEEE 802.11 series. An operation unit 402 includes a touch panel and buttons. A display unit 403 includes a display panel. The touch panel may be configured to have the functions of both of the operation unit 402 and the display unit 403. A control unit 405 includes a central processing unit (CPU). A storage unit 404 includes a memory such as random access memory (RAM) and read-only memory (ROM). The printer 101 also includes a bus 406. An acquisition unit 411 acquires an information element such as the DTIM period 222 from the beacon transmitted from the base station (AP 103 to 105). A calculation unit 412 calculates, from the information element acquired by the acquisition unit 411, an interval with which the base station transmits the beacon including DTIM. A determination unit 413 determines the setting of the base station based on the information element acquired by the acquisition unit 411 and the interval calculated by the calculation unit 412. A display control unit 414 controls indication regarding the setting of the base station, based on a determination result of the determination unit 413. A processing unit 415 determines the setting on the power saving of the communication apparatus, and gives an instruction to an apparatus with which the base station and/or the communication apparatus communicates (in this example, the PC 102). The bus 406 connects the above units with each other. Incidentally, some or all of the units 411 to 415 may be constituted as a software module achieved by causing the control unit 405 to read and execute a program stored in the storage unit 404 or a recording medium (not illustrated).

FIG. 5A illustrates a flowchart in which the control unit 405 reads and executes a program stored in the storage unit 404. In the present exemplary embodiment, the operation in this flowchart starts when the user manipulates the operation unit 402 to set an SSID to establish a connection with the AP 103. In this example, it is assumed that the user sets "AP 103", which is the SSID of the AP 103, as the SSID.

In step S501, the acquisition unit 411 receives the beacon transmitted by the base station according to instructions given by the control unit 405. In this example, the acquisition unit 411 receives the beacon having the SSID of "AP 103" that is transmitted by the AP 103. In step S502, the acquisition unit 411 acquires an information element group of the received beacon according to instructions given by the control unit 405. In this example, the acquisition unit 411 acquires the beacon interval 211 and the DTIM period 222 from among the information element group illustrated in FIG. 2. Incidentally, the beacon interval 211 of the AP 103 is "100", and the DTIM period 222 is "5". Subsequently, in step S503, according to instructions given by the control unit 405, the calculation unit 412 uses a predetermined calculation method to calculate the interval with which the base station transmits the beacon including DTIM. In this example, the interval is calculated by multiplying the beacon interval 211 by the DTIM period 222. In other words, the AP 103 derives 100×5=500 msec as the interval with which the beacon including DTIM is transmitted. Since the transmission interval of the beacon including DTIM of the AP 103 is 500 msec, there is a possibility that the broadcast or multicast data delays by 500 msec. For example, the PC 102 broadcasts an ARP request. In this example, it is assumed that the PC 102 is configured to wait 500 msec before replying to the ARP request. The broadcast ARP request is assumed to have arrived at the AP 103 right after the AP 103 transmits the beacon including DTIM. In this case, after 500 msec passes, the beacon including DTIM is transmitted, and thereafter the ARP request is transmitted. The defined time (500 msec) set in the PC 102 passes as described above, and consequently, there arises a problem in that the PC 102 cannot receive a response from the printer 101 and the digital camera 106.

In step S504, the determination unit 413 determines whether the transmission interval of the beacon including DTIM is equal to or more than a predetermined value according to instructions given by the control unit 405. More specifically, the determination unit 413 determines whether the transmission interval of the beacon including DTIM is equal to or more than 500 msec. When the transmission interval of the beacon including DTIM is equal to or more than the predetermined value, the processing proceeds to step S505. In this example, since the transmission interval of the beacon including DTIM of the AP 103 is 500 msec, the processing proceeds to step S505. In step S505, according to instructions given by the control unit 405, the display control unit 414 causes the display unit 403 to display "Communication may not be established. Please revise the setting of the access point." as an indication regarding the setting of the base station. As a result, when the transmission interval of the beacon including DTIM is equal to or more than the predetermined time, and there is a possibility that the data may delay, the message regarding the setting of the base station can be displayed to draw the user's attention. In other words, the user is given an opportunity to change the setting to reduce the delay of data transmitted by the base station. When the transmission interval of the beacon including DTIM is determined to be less than the predetermined time, the display unit 403 is controlled not to display the message regarding the setting of the base station. Accordingly, the display unit 403 does not display information unnecessary to the user.

Figure 5B:
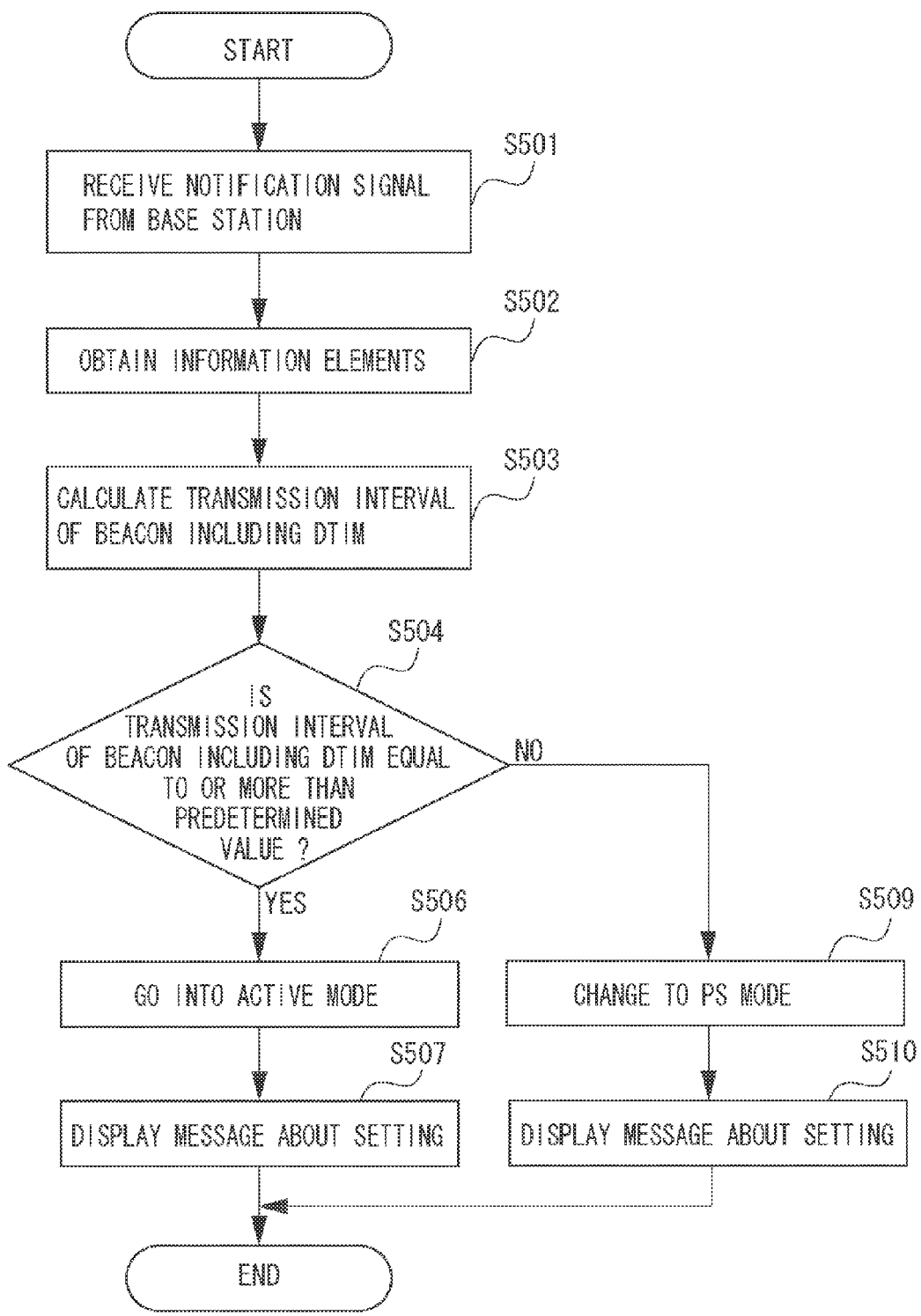

Incidentally, the control unit 405 may read a program from the storage unit 404, and may execute the flowchart as illustrate in FIG. 5B. The processing steps up to step S503 are similar as those described above, and the description thereof will not be repeated.

In step S504, according to instructions given by the control unit 405, the determination unit 413 determines whether the transmission interval of the beacon including DTIM is equal to or more than the predetermined value. More specifically, the determination unit 413 determines whether the transmission interval of the beacon including DTIM is equal to or more than 500 msec. When the transmission interval of the beacon including DTIM is determined to be equal to or more than the predetermined value, the processing proceeds to step S506. When the transmission interval of the beacon including DTIM is determined to be less than the predetermined value, the processing proceeds to step S509. In this example, since the transmission interval of the beacon including DTIM of the AP 103 is 500 msec, the processing proceeds to step S506. In step S506, according to instructions given by the control unit 405, the processing unit 415 determines to communicate with the base station upon turning off the power saving mode (in other words, going into an active mode in conformity with IEEE 802.11). Thereupon, when the network established by the base station has no longer any communication apparatus in the power saving mode, even multicast and broadcast data is immediately transmitted from the base station as soon as the base station receives the data. Therefore, the delay of the data transmitted by the base station can be reduced. However, in a case where the network established by the AP 103 includes the communication apparatus (the digital camera 106) in the PS mode as in the case of the present exemplary embodiment, multicasting and broadcasting delays. Accordingly, the processing proceeds to step S507. According to the control unit 405, the display control unit 414 causes the display unit 403 to display "Communication may not be established. Please revise the setting of the access point!" as the indication regarding the setting of the base station.

On the other hand, when the transmission interval of the beacon including DTIM is determined to be less than the predetermined value (in this example, 500 msec) in step S504, the processing proceeds to step S509. In step S509, the processing unit 415 determines to connect to the base station in the PS mode according to instructions given by the control unit 405. In step S510, according to instructions given by the control unit 405, the display control unit 414 causes the display unit 403 to display "connected in the power saving mode". In this example, since the transmission interval of the beacon including DTIM of the AP 103 is 500 msec in step S504, the processing proceeds to step S506. In step S506, the processing unit 415 determines to connect to the AP 103 in the active mode. Then, in step S507, the display control unit 414 causes the display unit 403 to display "Communication may not be established. Please revise the setting of the access point!".

As described above, in the first exemplary embodiment, the communication apparatus receives the beacon from the base station, and calculates, based on the received beacon, the transmission interval of the beacon including DTIM. Further, the communication apparatus controls the indication regarding the setting of the base station based on the calculated transmission interval. Accordingly, when the transmission interval of the beacon including DTIM is determined to be equal to or more than the predetermined time, and there is a possibility that the data may delay, the message regarding the setting of the base station can be displayed to draw the user's attention. Therefore, the user is given an opportunity to change the setting to reduce the delay of data transmitted by the base station. On the other hand, when the transmission interval of the beacon including DTIM is determined to be less than the predetermined time, the display unit 403 is controlled not to display the message regarding the setting of the base station. Accordingly, the display unit 403 does not display information unnecessary to the user.

Next, a second exemplary embodiment of the present invention will be described. In the first exemplary embodiment, if the transmission interval of the beacon including DTIM is determined to be equal to or more than the predetermined time, the message regarding the setting of the base station is displayed. In the second exemplary embodiment, if the transmission interval of the beacon including DTIM is determined to be equal to or more than the predetermined time, the base station is instructed to reduce the transmission interval of the beacon including DTIM. The configuration of the communication system according to the second exemplary embodiment is illustrated in FIG. 1, and the description thereof will not be repeated since it is similar to that of the first exemplary embodiment. The hardware configuration of the printer 101 serving as the communication apparatus is illustrated in FIG. 4, and the description thereof will not be repeated since it is similar to that of the first exemplary embodiment.

Figure 5C:
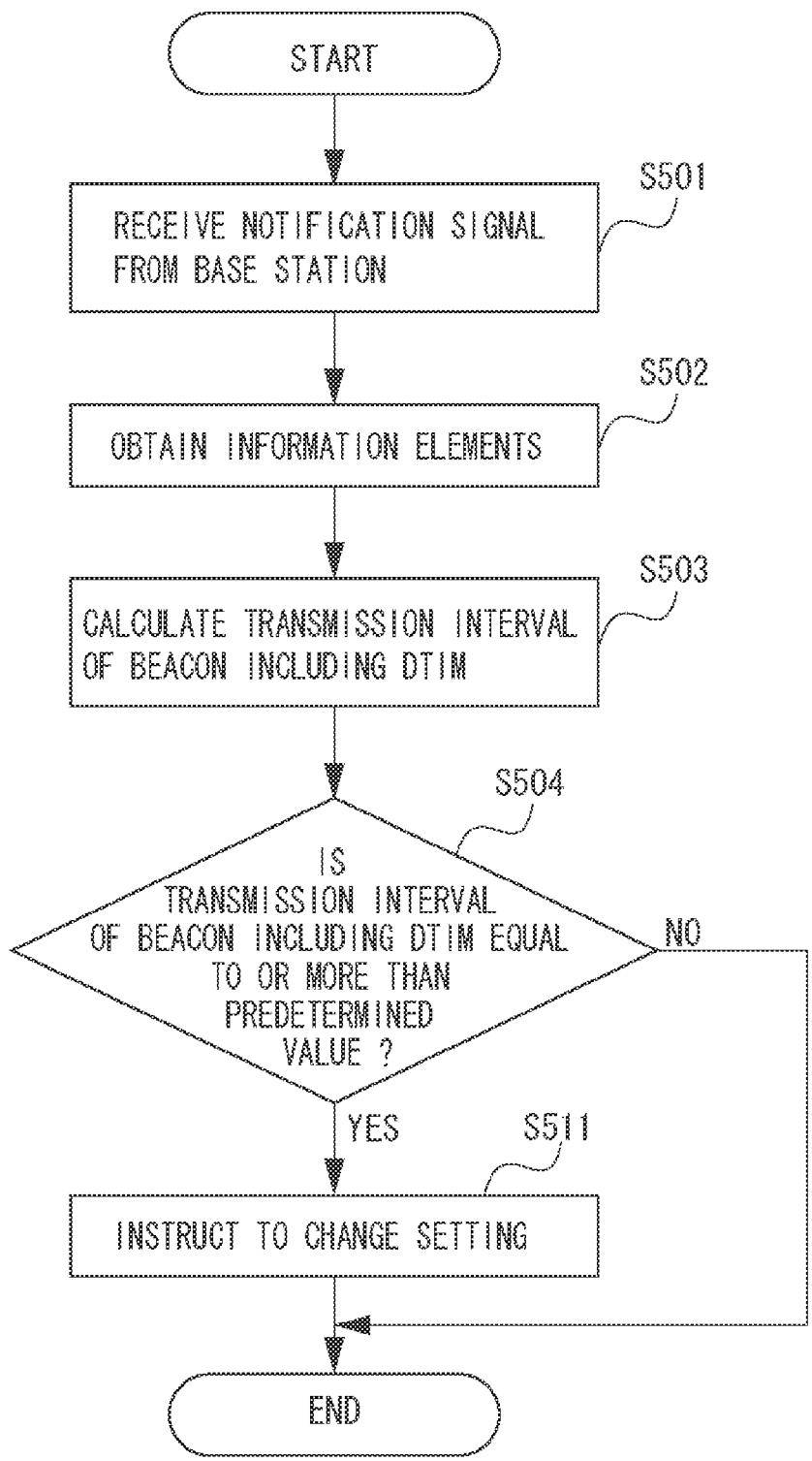

FIG. 5C illustrates a flowchart in which the control unit 405 reads and executes a program stored in the storage unit 404. Steps S501 to S503 are similar as the first exemplary embodiment, and the description thereof will not be repeated.

In step S504, according to instructions given by the control unit 405, the determination unit 413 determines whether the transmission interval of the beacon including DTIM is equal to or more than the predetermined value. More specifically, the determination unit 413 determines whether the transmission interval of the beacon including DTIM is equal to or more than 500 msec. When the transmission interval of the beacon including DTIM is equal to or more than the predetermine value, the processing proceeds to step S511. In step S511, according to instructions given by the control unit 405, the processing unit 415 transmits, to the base station, a command for instructing the base station to reduce the values of the beacon interval or the DTIM period of the base station. In this example, the AP 103 is instructed to change the setting of the beacon interval to "100" and the setting of the DTIM period to "4". Accordingly, when the base station reduces the values of the beacon interval or the DTIM period, the delay of the data transmitted by the base station can be reduced. On the other hand, when a connection is established with the base station of which the transmission interval of the beacon including DTIM is determined to be equal to or more than the predetermined value in step S504, an apparatus in communication with the communication apparatus (in this example, the PC 102) may be instructed to increase the setting value of time-out of the ARP request and the like, so that the ARP request is less likely to time-out.

Next, a third exemplary embodiment of the present invention will be described. In the second exemplary embodiment, the base station is instructed to change the setting when the transmission interval of the beacon including DTIM is determined to be equal to or more than the predetermined time. In the third exemplary embodiment, when the transmission interval of the beacon including DTIM is determined to be less than the predetermined time, the base station is instructed to increase the transmission interval of the beacon including DTIM. The configuration of the communication system according to the third exemplary embodiment is illustrated in FIG. 1, and the description thereof will not be repeated since it is similar to that of the first exemplary embodiment. The hardware configuration of the printer 101 serving as the communication apparatus is illustrated in FIG. 4, and the description thereof will not be repeated since it is similar to that of the first exemplary embodiment.

Figure 5D:
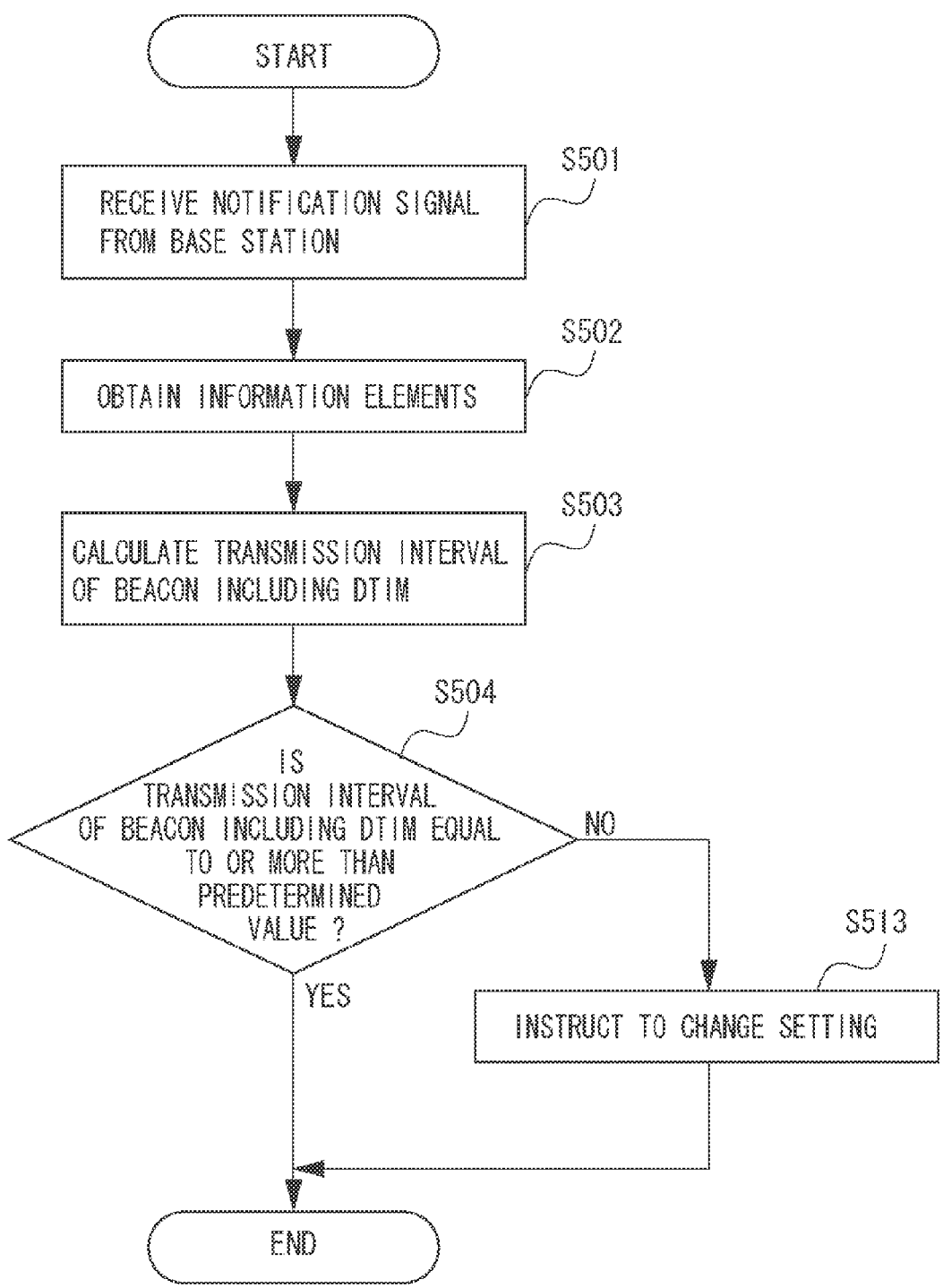

FIG. 5D illustrates a flowchart in which the control unit 405 reads and executes a program stored in the storage unit 404. Steps S501 to S503 are similar as the first exemplary embodiment, and the description thereof will not be repeated.

In step S504, according to instructions given by the control unit 405, the determination unit 413 determines whether the transmission interval of the beacon including DTIM is equal to or more than the predetermined value. More specifically, the determination unit 413 determines whether the transmission interval of the beacon including DTIM is equal to or more than 200 msec.

When the transmission interval of the beacon including DTIM is determined not to be equal to or more than the predetermined value (namely, is less than the predetermined value), the processing proceeds to step S513. In step S513, according to instructions given by the control unit 405, the processing unit 415 transmits, to the base station, a command for instructing the base station to increase the values of the beacon interval or the DTIM period of the base station. In this example, the AP 103 is instructed to change the setting of the beacon interval to "100" and the setting of the DTIM period to "3". Accordingly, an apparatus in the power saving mode residing in the network established by the base station (in this example, the digital camera 106) has a longer interval of intermittent beacon reception, so that the power consumption of the apparatus in the power saving mode can be further reduced. On the other hand, when a connection is established with the base station of which the transmission interval of the beacon including DTIM is determined to be less than the predetermined value in step S504, an apparatus in communication with the communication apparatus (in this example, the PC 102) may be instructed to decrease the setting value of time-out of the ARP request and the like, so that the apparatus in communication with the communication apparatus (in this example, the PC 102) can make a determination on time-out in a shorter time, thus improving the convenience of the user.

Next, a fourth exemplary embodiment of the present invention will be described. In the first to third exemplary embodiments, the communication apparatus receives the beacon, and the transmission interval of the beacon including DTIM is calculated based on the received beacon. In the fourth exemplary embodiment, the communication apparatus (the PC 102) requests an information element from another communication apparatus (the printer 101). The other communication apparatus acquires the information element from the beacon according to the instruction given by the communication apparatus, and transmits the information element to the communication apparatus. The communication apparatus calculates the transmission interval of the beacon including DTIM, based on the information element received from the other communication apparatus. The configuration of the communication system according to the fourth exemplary embodiment is illustrated in FIG. 1, and the description thereof will not be repeated since it is similar to that of the first exemplary embodiment. In the present exemplary embodiment, the printer 101 can wirelessly communicate with the AP 103.

FIG. 6A is a hardware configuration diagram illustrating the PC 102 serving as a communication apparatus. A wired unit 611 includes a wired chip and a connector in conformity with IEEE 802.3. An operation unit 612 includes a touch panel and buttons. A display unit 613 includes a liquid crystal panel. The touch panel may be configured to have the functions of both of the operation unit 612 and the display unit 613. A control unit 614 includes a CPU. A storage unit 615 includes a memory such as RAM and ROM. The PC 102 also includes a bus 616. A cooperation unit 621 is arranged to cooperate with another communication apparatus. A calculation unit 622 calculates, from the information element acquired by the cooperation unit 621, an interval with which the base station transmits the beacon including DTIM. A determination unit 623 determines the setting of the base station based on the interval calculated by the calculation unit 622. A display control unit 624 controls the indication regarding the setting of the base station, based on a determination result of the determination unit 623. The bus 616 connects the above units with each other. Incidentally, some or all of the units 621 to 624 may be constituted as a software module achieved by causing the control unit 614 to read and execute a program stored in the storage unit 615 or a recording medium, not illustrated. FIG. 6B is a hardware configuration diagram of the printer 101 serving as the other communication apparatus. In this example, the units 401 to 406 and 411 are similar as those of the first exemplary embodiment, and the description thereof will not be repeated. A cooperation unit 601 is arranged to communicate with the communication apparatus. Incidentally, some or all of the units 411 and 601 may be constituted as a software module achieved by causing the control unit 405 to read and execute a program stored in the storage unit 404 or a recording medium, not illustrated.

Figure 7A:
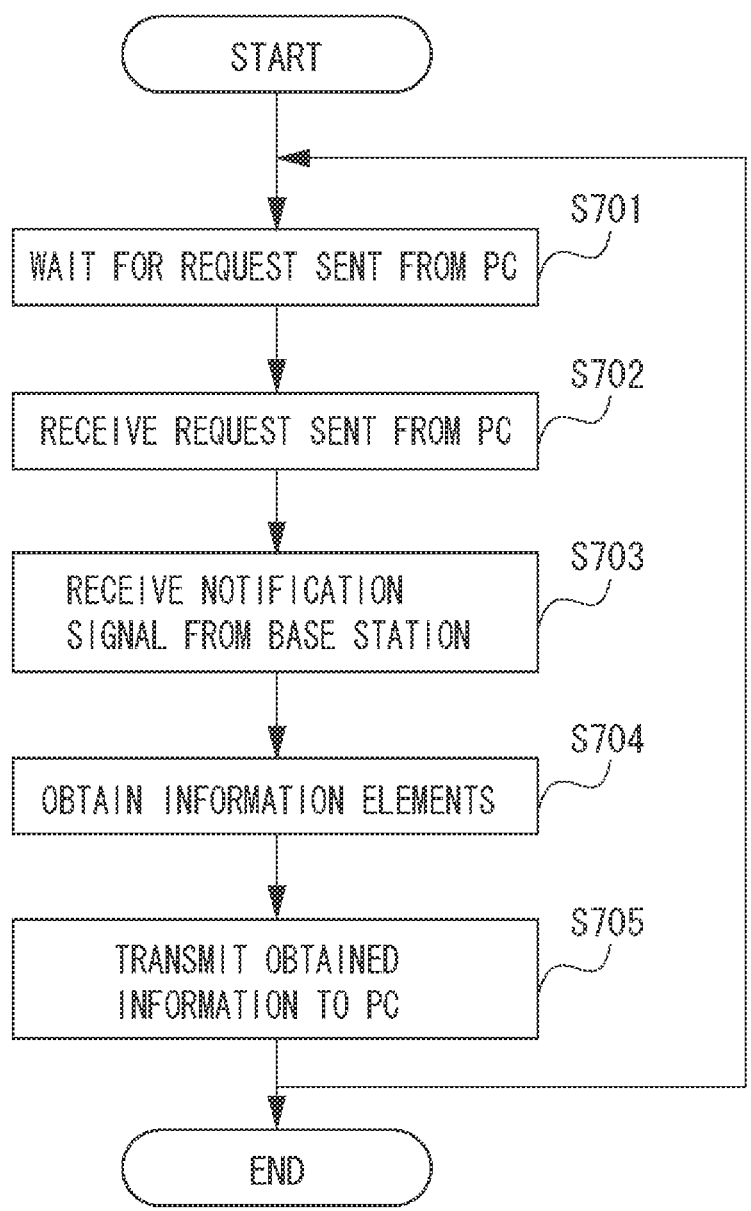

FIG. 7A illustrates a flowchart in which the control unit 405 reads and executes a program stored in the storage unit 404. In the present exemplary embodiment, the processing in this flowchart starts when the printer 101 turns on. In step S701, according to instructions given by the control unit 405, the cooperation unit 601 waits until the PC 102 serving as a communication apparatus sends a request for acquiring an information element. In the present exemplary embodiment, a particular Transmission Control Protocol (TCP) packet including an IP address of the PC 102, i.e., sender of request, and an identifier representing the request is used in the request for acquiring the information element. In step S702, according to instructions given by the control unit 405, the cooperation unit 601 receives the request for acquiring the information element from the PC 102. In step S703, according to instructions given by the control unit 405, the acquisition unit 411 receives the beacon transmitted by the AP 103. Incidentally, the timing at which the beacon is received is not limited to timing after the reception of the request for acquiring the information element. In step S704, according to instructions given by the control unit 405, the acquisition unit 411 acquires an information element group of the received beacon. In this example, the beacon interval 211 and the DTIM period 222 are acquired from the information element group illustrated in FIG. 2. Incidentally, the beacon interval 211 is "100", and the DTIM period 222 is "5". In step 705, according to instructions given by the control unit 405, the cooperation unit 601 transmits the information element acquired in step S704 to the PC 102, i.e., a sender of the request for acquiring the information element. In the present exemplary embodiment, the cooperation unit 601 transmits a particular TCP packet including the IP address of the sender of the request, the IP address of the sender of the information element, and the information element. Then, the processing returns to step S701 in the printer 101, the printer 101 waits until the request for acquiring the information element is received from the PC 102.

Figure 7B:
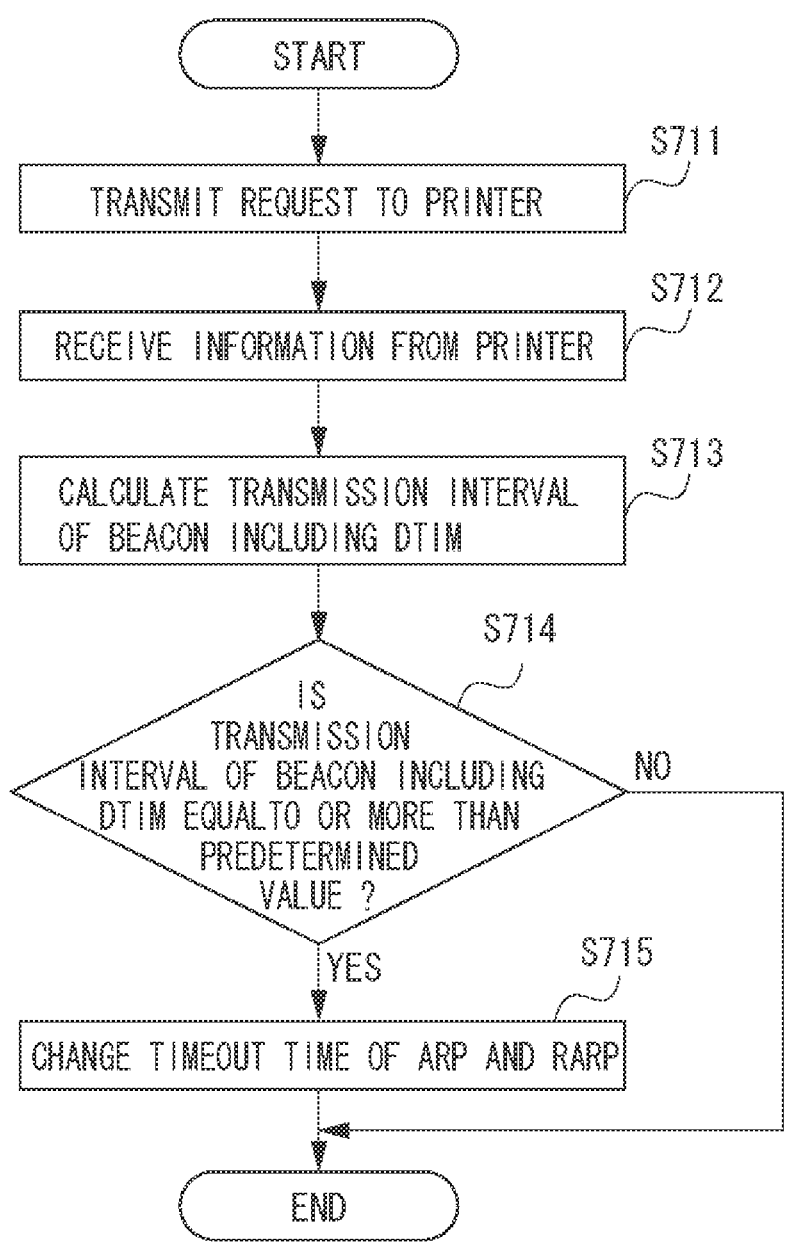

FIG. 7B illustrates a flowchart in which the control unit 614 reads and executes a program stored in the storage unit 615. In the present exemplary embodiment, the processing in this flowchart starts when the user manipulates the operation unit 612 to instruct the printer 101 to perform printing operation. In step S711, according to instructions given by the control unit 614, the cooperation unit 621 transmits the request for acquiring the information element to the printer 101. In step S712, according to instructions given by the control unit 614, the cooperation unit 621 receives the information element from the printer 101. In this example, the beacon interval 211 and the DTIM period 222 are received as the information element. In step S713, according to instructions given by the control unit 614, the calculation unit 622 calculates an interval with which the base station transmits the beacon including DTIM according to a predetermined calculation method. In this example, the interval is calculated by multiplying the beacon interval 211 by the DTIM period 222. In other words, the AP 103 derives 100×5=500 msec as the interval with which the beacon including DTIM is transmitted. In step S714, according to instructions given by the control unit 614, the determination unit 623 determines whether the transmission interval of the beacon including DTIM is equal to or more than the predetermined value. More specifically, the determination unit 623 determines whether the transmission interval is equal to or more than 500 msec. When the transmission interval is equal to or more than the predetermined value, the processing proceeds to step S715. In this example, since the transmission interval of the beacon including DTIM of the AP 103 is 500 msec, the processing proceeds to step S715. In step S715, the control unit 614 increases the setting value of time-out of broadcast or multicast data transmitted by the PC 102. In this example, the setting value of time-out of an ARP request and a RARP request is set to 1000 msec. As a result, the PC 102 is less likely to result in time-out.

Incidentally, step 716 may be performed instead of step S715 as illustrated in FIG. 7C. In step S716, according to instructions given by the control unit 614, the display control unit 624 causes the display unit 613 to display a warning about the setting of the base station. More specifically, the display unit 613 displays "Communication may not be established. Please revise the setting of the access point!" As a result, even if the PC 102 cannot increase the setting value of time-out of broadcast or multicast data, the warning can be displayed. Therefore, the user is given an opportunity to change the setting to reduce the delay of data transmitted by the base station.

As described above, in the fourth exemplary embodiment, the communication apparatus requests an information element from another communication apparatus. The other communication apparatus acquires the information element from the beacon according to the instruction given by the communication apparatus, and transmits the information element to the communication apparatus. The communication apparatus calculates the transmission interval of the beacon including DTIM, based on the information element received from the other communication apparatus. Further, the communication apparatus controls the indication regarding the setting of the base station based on the calculated transmission interval. Therefore, even where the communication apparatus cannot receive the beacon, the communication apparatus requests the information element from the communication apparatus, i.e., the apparatus in communication with the communication apparatus, and calculates the transmission interval of the beacon including DTIM, so that the indication regarding the setting of the base station can be controlled. Alternatively, in the present exemplary embodiment, the other communication apparatus may transmit the information element, and the communication apparatus may request the other communication apparatus to calculate the transmission interval of the beacon including DTIM, so that the other communication apparatus transmits the transmission interval of the beacon including DTIM to the communication apparatus. In this way, the communication apparatus can also recognize the transmission interval of the beacon including DTIM. Alternatively, the other communication apparatus may perform the processing steps up to the determination based on the transmission interval of the beacon including DTIM, and the determination result may be transmitted to the communication apparatus.

Next, a fifth exemplary embodiment of the present invention will be described. In the first to fourth exemplary embodiments, the communication apparatus makes a determination on one base station based on the transmission interval of the beacon including DTIM. In the fifth exemplary embodiment, the communication apparatus makes a determination on a plurality of base stations based on the transmission interval of the beacon including DTIM and beacon interval. The configuration of the communication system according to the fifth exemplary embodiment is illustrated in FIG. 1, and the description thereof will not be repeated since it is similar to that of the first exemplary embodiment. In the present exemplary embodiment, the printer 101 can wirelessly connect to the APs 103 to 106. The hardware of the printer 101 serving as the communication apparatus is illustrated in FIG. 4, and the description thereof will not be repeated since it is similar to that of the first exemplary embodiment.

Figure 8A:
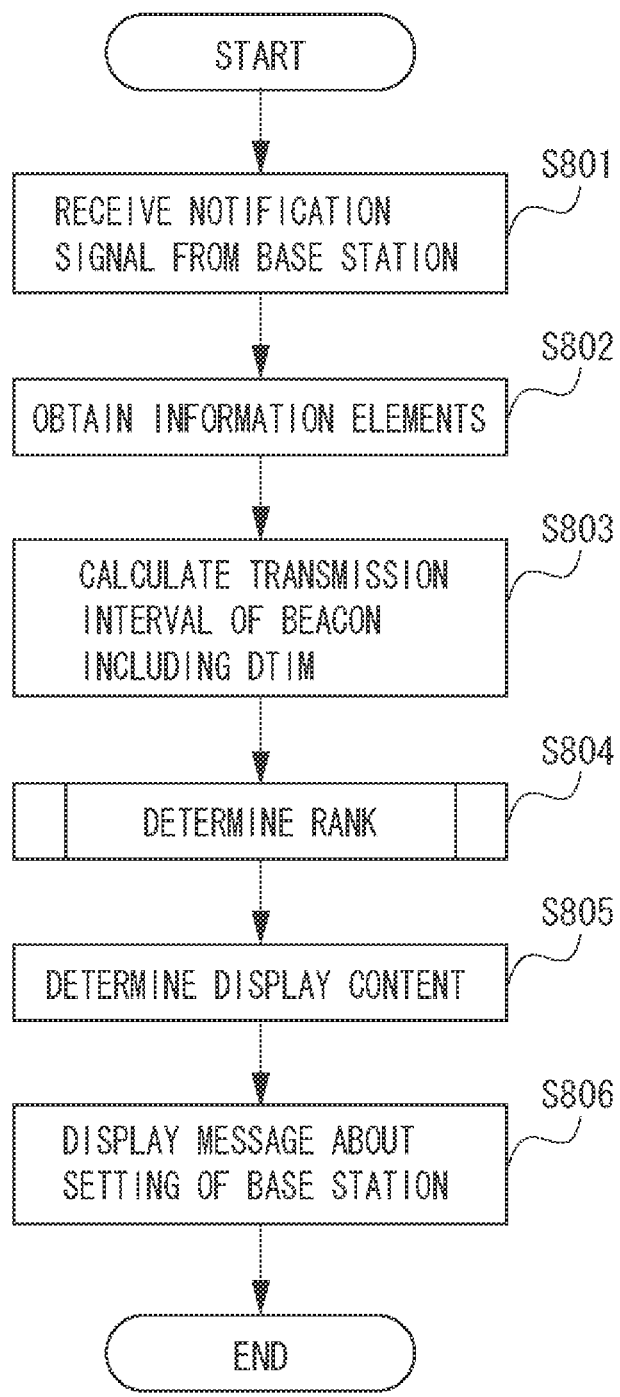

FIG. 8A illustrates a flowchart in which the control unit 405 reads and executes a program stored in the storage unit 404. In the present exemplary embodiment, a connection is made to any one of the APs 103 to 105 in the flowchart illustrated in FIG. 8A. Accordingly, the operation in this flowchart starts when the user manipulates the operation unit 402 to instruct scanning of APs. In step S801, according to instructions given by the control unit 405, the acquisition unit 411 receives the beacon transmitted by the base station. In this example, the acquisition unit 411 receives the beacon transmitted by the APs 103 to 105. In step S802, according to instructions given by the control unit 405, the acquisition unit 411 acquires an information element group of the received beacon. In this example, the beacon interval 211 and the DTIM period 222 are acquired from the information element group illustrated in FIG. 2. In this example, the beacon interval 211 of the AP 103 is set to "100", and the DTIM period 222 is set to "5". The beacon interval 211 of the AP 104 is set to "100", and the DTIM period 222 is set to "1". The beacon interval 211 of the AP 105 is set to "500", and the DTIM period 222 is set to "1". Subsequently, in step S803, according to instructions given by the control unit 405, the calculation unit 412 calculates an interval with which the base station transmits the beacon including DTIM according to a predetermined calculation method. In this example, the interval is calculated by multiplying the beacon interval 211 by the DTIM period 222. Therefore, according to this calculation, the transmission interval of the beacon including DTIM of the AP 103 is 500 msec, the transmission interval of the beacon including DTIM transmitted by the AP 104 is 100 msec, and the transmission interval of the beacon including DTIM transmitted by the AP 105 is 500 msec. In step S804, according to instructions given by the control unit 405, the determination unit 413 determines a rank based on the beacon interval 211 and the transmission interval of the beacon including DTIM.

The details of the determination made by the determination unit 413 in step S804 on each base station are illustrated in FIG. 8B. In step S811, according to instructions given by the control unit 405, the determination unit 413 determines whether the value of the transmission interval of the beacon including DTIM calculated by the calculation unit 412 is equal to or more than the predetermined value. When the transmission interval of the beacon including DTIM is equal to or more than the predetermined value, the processing proceeds to step S812. When the transmission interval of the beacon including DTIM is not equal to or more than the predetermined value, the processing proceeds to step S815. In this example, it is determined whether the value of the transmission interval of the beacon including DTIM is 500 or more. In the AP 103 and 105, the value of the transmission interval of the beacon including DTIM is 500, and accordingly the processing proceeds to step S812. In the AP 104, the value of the transmission interval of the beacon including DTIM is 100, and accordingly the processing proceeds to step S815. In step S812, according to instructions given by the control unit 405, the determination unit 413 determines whether the value of the beacon interval 211 acquired by the acquisition unit 411 is equal to or more than the predetermined value. When the beacon interval 211 is determined to be equal to or more than the predetermined value, the processing proceeds to step S813, in which the determination unit 413 determines that the base station is at rank D according to instructions given by the control unit 405. When the beacon interval 211 is determined not to be equal to or more than the predetermined value, the processing proceeds to step S814, in which the determination unit 413 determines that the base station is at rank C according to instructions given by the control unit 405. In this example, it is determined whether the value of the beacon interval 211 is equal to or more than 200. Since the beacon interval 211 of the AP 105 is 500, the processing proceeds to step S813, in which the determination unit 413 determines that the AP 105 is at rank D. On the other hand, since the value of the beacon interval 211 of the AP 103 is 100, the processing proceeds to step S814, in which the determination unit 413 determines that the AP 103 is at rank C. Subsequently, step S815 will be described. In step S815, according to instructions given by the control unit 405, the determination unit 413 determines whether the value of the beacon interval 211 acquired by the acquisition unit 411 is equal to or more than the predetermined value. Where the beacon interval 211 is determined to be equal to or more than the predetermined value, the processing proceeds to step S816, in which the determination unit 413 determines that the base station is at rank B according to instructions given by the control unit 405. When the beacon interval 211 is determined not to be equal to or more than the predetermined value, the processing proceeds to step S817, in which the determination unit 413 determines that the base station is at rank A according to instructions given by the control unit 405. In this example, it is determined whether the value of the beacon interval 211 is 200 or more. Since the value of the beacon interval 211 of the AP 104 is 100, the processing proceeds to step S817, in which the determination unit 413 determines that the AP 104 is at rank A.

In step S805, according to instructions given by the control unit 405, the display control unit 414 determines the control of the indication regarding the setting of the base station based on the determination made in step S804. More specifically, in the case of determination "rank A", the display control unit 414 determines to cause the display unit 403 to display "Good: This is recommended. (Please see the setting manual if you want to decrease the power consumption.)". In the case of determination "rank B", the display control unit 414 determines to cause the display unit 403 to display "Not Good: Data reception may fail in the power saving mode. (Please see the setting manual if you want to increase the reliability of data reception.)". In the case of determination "rank C", the display control unit 414 determines to cause the display unit 403 to display "Not Good: Data reception may fail. (Please see the setting manual if you want to increase the reliability of data reception.)". In the case of determination "rank D", the display control unit 414 determines to cause the display unit 403 to display "Bad: There is problem in data reception. (Please see the setting manual if you want to increase the reliability of data reception.)". Incidentally, the messages are stored in the storage unit 404. In step S806, according to instructions given by the control unit 405, the display control unit 414 controls the display unit 403 based on the determination made in step S805. In this example, as illustrated in FIG. 9, the display control unit 414 determines to cause the display unit 403 to display the messages which are sorted in descending order of rank (in this example, it is assumed that A is the highest rank, and B, C, and D follow in this order.).

As described above, in the fifth exemplary embodiment, the communication apparatus makes the determination on the plurality of base stations, based on the transmission interval of the beacon including DTIM and beacon interval. As a result, the indication regarding the setting of the base station can be displayed for the plurality of base stations. Therefore, the user can select a base station appropriate for making connection from among the plurality of base stations. Further, since the evaluation is based on not only the transmission interval of the beacon including DTIM but also the beacon interval, a determination can be made based also on unicast data transmission. Alternatively, the communication apparatus may be configured to connect to the base station having the highest rank (in this example, it is assumed that A is the highest rank, and B, C, and D follow in this order.).

In this case, the printer 101 connects to the AP 104. Therefore, since the connection can be made with the base station that is appropriately configured, the convenience of the user is enhanced.

Next, a sixth exemplary embodiment of the present invention will be described. In the sixth exemplary embodiment, the communication apparatus determines the setting of the communication apparatus based on the beacon interval. The communication apparatus operating in the PS mode determines whether there is any unicast data addressed to the communication apparatus itself based on the information about the TIM 213 included in the beacon. When there is unicast data addressed to the communication apparatus, the communication apparatus changes to an awake state defined by IEEE 802.11, and receives unicast data from the base station. Further, since the base station transmits the beacon with the transmission interval of the beacon interval, the unicast data transmitted to the communication apparatus operating in the PS mode delays by a delay time according to the beacon interval. On the other hand, the base station transmits data to a communication apparatus operating in the active mode as soon as the base station receives the data regardless of the beacon interval of the unicast data. The configuration of the communication system according to the sixth exemplary embodiment is illustrated in FIG. 1, and the description thereof will not be repeated since it is similar to that of the first exemplary embodiment. In the present exemplary embodiment, the printer 101 can wirelessly communicate with the AP 103.

FIG. 10A illustrates a flowchart in which the control unit 405 reads and executes a program stored in the storage unit 404. In the present exemplary embodiment, the operation in the flowchart illustrated in FIG. 10A starts when the user manipulates the operation unit 402 to instruct scanning of APs to establish a connection with a base station. In step S1001, according to instructions given by the control unit 405, the acquisition unit 411 receives a beacon transmitted by a base station (in this example, the AP 103). In step S1002, according to instructions given by the control unit 405, the acquisition unit 411 acquires an information element group of the received beacon. In this example, the acquisition unit 411 acquires the information element group indicating that the beacon interval of the AP 103 is "100". In step S1003, according to instructions given by the control unit 405, the determination unit 413 determines whether the beacon interval is equal to or more than the predetermined value. When the beacon interval is determined to be equal to or more than the predetermined value, the processing proceeds to step S1004, in which the processing unit 415 determines to connect with the base station in the active mode according to instructions given by the control unit 405. When the beacon interval is determined to be less than the predetermined value, the processing proceeds to step S1005, in which the processing unit 415 determines to connect to the base station in the PS mode according to instructions given by the control unit 405. In this example, it is determined whether the beacon interval is 200 or more. Since the beacon interval of the AP 103 is 100, the processing proceeds to step S1005, in which the processing unit 415 determines to connect to the AP 103 in the PS mode according to instructions given by the control unit 405. In step S1006, according to instructions given by the control unit 405, the display control unit 414 causes the display unit 403 to display the determined mode. In this example, the display control unit 414 causes the display unit 403 to display "the PS mode". Further, according to instructions given by the control unit 405, the wireless unit 401 makes a connection with the base station in the determined mode. In this example, the printer 101 connects to the AP 103 in the PS mode. With this configuration, when the value of the beacon interval is large, and there is a large delay in the unicast data, the communication apparatus operates in the active mode. Therefore, the base station transmits the unicast data immediately after the base station receives the data regardless of the beacon interval. Therefore, the delay of the data transmitted by the base station can be reduced. In other words, unicast audio or video data is less likely to delay, and the quality of audio or video data is less likely to deteriorate. In addition, when the determined mode is displayed, the determined mode can be notified to the user, so that the convenience of the user can be improved.

Incidentally, the control unit 405 may read the program stored in the storage unit 404 to execute the flowchart illustrated in FIG. 10B. The processing steps up to step S1003 are similar as those described above, and the description thereof will not be repeated. In step S1003, according to instructions given by the control unit 405, the determination unit 413 determines whether the beacon interval is equal to or more than the predetermined value. When the beacon interval is determined to be equal to or more than the predetermined value, the processing proceeds to step S1007, in which the display control unit 414 causes the display unit 403 to display "Communication may not be established. Please revise the setting of the access point!" as the indication regarding the setting of the base station, according to instructions given by the control unit 405. As a result, when the transmission interval of the beacon is equal to or more than the predetermined time, and there is a possibility that the data may delay, the message regarding the setting of the base station can be displayed to draw the user's attention. Therefore, the user is given an opportunity to change the setting to reduce the delay of data transmitted by the base station.

Next, a seventh exemplary embodiment of the present invention will be described. In the seventh exemplary embodiment, the communication apparatus gives an instruction to a base station and/or an apparatus in communication, based on the transmission interval of the beacon including DTIM and beacon interval. The configuration of the communication system according to the seventh exemplary embodiment is illustrated in FIG. 1, and the description thereof will not be repeated since it is similar to that of the first exemplary embodiment. In the present exemplary embodiment, the printer 101 can wirelessly communicate with the AP 103. The printer 101 can communicate with the PC 102 via the AP 103. The hardware configuration of the printer 101 serving as the communication apparatus is similar as that of the first exemplary embodiment, and accordingly the description thereof will not be repeated.

FIG. 10C illustrates a flowchart in which the control unit 405 reads and executes a program stored in the storage unit 404. In the present exemplary embodiment, the operation in the flowchart illustrated in FIG. 10C starts when the user manipulates the operation unit 402 to instruct scanning of APs to establish a connection with a base station. In step S1011, according to instructions given by the control unit 405, the acquisition unit 411 receives a beacon transmitted by the base station. In this example, the acquisition unit 411 receives the beacon transmitted by the AP 103. In step S1012, according to instructions given by the control unit 405, the acquisition unit 411 acquires an information element group of the received beacon. In this example, the beacon interval 211 of the AP 103 is "100", and the DTIM period 222 is "5". In step S1013, according to instructions given by the control unit 405, the calculation unit 412 calculates an interval with which the base station transmits the beacon including DTIM according to a predetermined calculation method. In other words, the AP 103 derives 100×5=500 msec as the interval with which the beacon including DTIM is transmitted.

In step S1014, according to instructions given by the control unit 405, the determination unit 413 determines rank by performing the same processing steps as those in steps S811 to S816 in the fifth exemplary embodiment. In this example, it is assumed that the AP 103 is determined to be at rank C. In step S1015, according to instructions given by the control unit 405, the processing unit 415 instructs the base station to decrease the value of the beacon interval and/or the DTIM period of the base station based on the rank determined in step S1014. More specifically, in step S1014, the processing unit 415 instructs the base station to change the value so that the base station is determined to be at rank A. For example, in the case of rank D, the base station is instructed to set the value of the beacon interval to 100 and the value of the DTIM period to 2. In the case of rank C, for example, the base station is instructed to change the value of the DTIM period to 2. In the case of rank B, for example, the base station is instructed to change the value of the beacon interval to 100. Incidentally, in the case of rank A, no instruction is given. In this example, since the AP 103 is at rank C, the processing unit 415 instructs the AP 103 to change the value of the DTIM period to 2. When the AP 103 follows the instruction, the interval with which the AP 103 transmits the beacon including DTIM becomes 100×2=200 msec. Therefore, the delay of the data transmitted by the base station can be reduced. When the AP 103 does not follow the instruction, the printer 101 may cause the display unit 403 to display the same messages as those in the fifth exemplary embodiment. In this example, the printer 101 may cause the display unit 403 to display "Data reception may fail. (Please see the setting manual if you want to increase the reliability of data reception.)". In this way, the user is given an opportunity to change the setting to reduce the delay of data transmitted by the base station. Further, in step S1015, according to instructions given by the control unit 405, the processing unit 415 may give an instruction to an apparatus in communication with the processing unit 415, based on the rank determined in step S1014. In this example, the processing unit 415 gives an instruction for increasing the setting value of time-out used by communication such as ARP set in the PC 102. In this example, an instruction is given to set the setting value of time-out to 1000 msec. Alternatively, an instruction may be given to set a value based on values of the beacon interval and the DTIM period. Accordingly, when the setting of the apparatus in communication is changed, the time-out of the apparatus in communication can be suppressed by delaying the data transmitted by the base station. When the apparatus in communication does not follow the instruction for changing the setting, the user may be reminded of it. Accordingly, the user is given an opportunity to change the setting to reduce the delay of data transmitted by the base station.

The first to seventh exemplary embodiments of the present invention have been described. However, the exemplary embodiments of the present invention are not limited thereto. For example, in the fourth exemplary embodiment, the indication regarding the setting of the communication apparatus or the other communication apparatus may be controlled, instead of controlling the indication regarding the setting of the base station. Further, for example, the first to fifth exemplary embodiments may be combined to perform the connection control first and thereafter perform the corresponding display control, or perform the display control first and thereafter the corresponding connection control. Still further, for example, the fourth, sixth, and seventh exemplary embodiments may be combined, so that the base station is instructed to change the setting, or the communication apparatus changes the setting, based on the information element group of the beacon acquired by the communication apparatus from the other communication apparatus. Further, for example, the first to third, sixth, and seventh exemplary embodiments and the fourth exemplary embodiment may be combined, so that the determination based on the transmission interval of the beacon including DTIM is performed on the PC side.

The present invention may be achieved by providing a system or an apparatus with a storage medium recorded with program code of software for realizing the above functions, or causing a computer (CPU, MPU) of a system or an apparatus to read and execute the program code stored in the storage medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-114444 filed May 11, 2009, which is hereby incorporated by reference herein in its entirety.

What is claimed is:

1. A communication apparatus comprising:
   an obtaining unit configured to obtain information, about (1) a beacon interval and (2) a number of beacon intervals between successive beacons that include a Deliver Traffic Indication Message (DTIM), of a base station defined in IEEE 802.11 series;
   a determination unit configured to determine whether the communication apparatus is operated in a power save mode, in which a state to receive data from the base station and a state not to receive the data from the base station are alternated, as defined in IEEE 802.11 series, based on the beacon interval and the number of beacon intervals between successive beacons that include a DTIM; and
   a control unit configured to operate the communication apparatus in the power save mode or a mode, in which the state to receive data from the base station is maintained without shifting to the state not to receive data from the base station, different from the power save mode, based on the beacon interval and the number of beacon intervals between successive beacons that include a DTIM.

2. The communication apparatus according to claim 1, wherein the control unit determines whether or not to operate the communication apparatus in the power save mode defined in the IEEE 802.11 series during connection with the base station.

3. The communication apparatus according to claim 1, wherein the obtaining unit obtains information about the beacon interval and the number of beacon intervals between successive beacons that include a DTIM of each of a plurality of base stations, the communication apparatus further comprising:
   a selection unit configured to select a base station from the plurality of base stations based on the obtained information.

4. A method for a communication apparatus, comprising:
   obtaining information, about (1) a beacon interval and (2) a number of beacon intervals between successive beacons that include a Delivery Traffic Indication Message (DTIM), of a base station defined in IEEE 802.11 series;
   determining whether the communication apparatus is operated in a power save mode, in which a state to receive data from the base station and a state not to receive the data from the base station are alternated, as defined in IEEE 802.11 series, based on the beacon interval and the number of beacon intervals between successive beacons that include a DTIM; and
   operating the communication apparatus in the power save mode or a mode, in which the state to receive data from the base station is maintained without shifting to the state not to receive data from the base station, different from the power save mode, based on the beacon interval and the number of beacon intervals between successive beacons that include a DTIM.

5. A non-transitory computer-readable storage medium storing a program which, when executed by a computer, causes a communication apparatus to perform operations comprising:
   obtaining information, about (1) a beacon interval and (2) a number of beacon intervals between successive beacons that include a Delivery Traffic Indication Message (DTIM), of a base station defined in IEEE 802.11 series;
   determining whether the communication apparatus is operated in a power save mode, in which a state to receive data from the base station and a state not to receive the data from the base station are alternated, as defined in IEEE 802.11 series, based on the beacon interval and the number of beacon intervals between successive beacons that include a DTIM; and
   operating the communication apparatus in the power save mode or a mode, in which the state to receive data from the base station is maintained without shifting to the state not to receive data from the base station, different from the power save mode, based on the beacon interval and the number of beacon intervals between successive beacons that include a DTIM.

* * * * *